(12) United States Patent
Prabha Narra et al.

(10) Patent No.: US 11,491,729 B2
(45) Date of Patent: Nov. 8, 2022

(54) NON-DIMENSIONALIZATION OF VARIABLES TO ENHANCE MACHINE LEARNING IN ADDITIVE MANUFACTURING PROCESSES

(71) Applicant: Carnegie Mellon University, Pittsburgh, PA (US)

(72) Inventors: Sneha Prabha Narra, Pittsburgh, PA (US); Jack Lee Beuth, Jr., Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 670 days.

(21) Appl. No.: 16/402,056

(22) Filed: May 2, 2019

(65) Prior Publication Data

US 2019/0337232 A1   Nov. 7, 2019

Related U.S. Application Data

(60) Provisional application No. 62/762,398, filed on May 2, 2018.

(51) Int. Cl.
*B29C 64/393* (2017.01)
*B29C 64/153* (2017.01)
(Continued)

(52) U.S. Cl.
CPC ............ *B29C 64/393* (2017.08); *B22F 10/20* (2021.01); *B29C 64/153* (2017.08); *G06F 30/23* (2020.01);
(Continued)

(58) Field of Classification Search
CPC ..... B29C 64/393; B29C 64/153; B33Y 10/00; B33Y 50/02; G06N 20/00; G06N 3/08;
(Continued)

(56) References Cited

U.S. PATENT DOCUMENTS

| 10,328,532 B2 | 6/2019 | Beuth | |
| 2014/0249773 A1* | 9/2014 | Beuth, Jr. | B29C 37/005 702/155 |
| 2016/0184893 A1* | 6/2016 | Dave | B22F 10/20 419/53 |

FOREIGN PATENT DOCUMENTS

| WO | WO 2013/019663 | 2/2013 |
| WO | WO 2014/028879 | 2/2014 |

* cited by examiner

*Primary Examiner* — Michael P Wieczorek
(74) *Attorney, Agent, or Firm* — Fish & Richardson P.C.

(57) ABSTRACT

A method for training a machine learning engine for modeling of a physical system includes receiving process data representing measurements of a physical system. The method includes applying a transform to values of the at least two variables of the process data to generate a dimensionless parameter having a parameter value corresponding to each measurement of the physical system for the at least two variables. The method includes training the machine learning engine using a set of generated training data including the non-dimensionalized parameter, to output a prediction of a value of a physical effect of the physical system for values of the variables that are not included in the process data. The method includes controlling an additive manufacturing process for the material by setting the at least one physical property to the value of the at least one process variable during fabrication of a part.

14 Claims, 20 Drawing Sheets

(51) Int. Cl.
  *G06N 20/00*   (2019.01)
  *G06N 3/08*    (2006.01)
  *G06F 30/23*   (2020.01)
  *B22F 10/20*   (2021.01)
  *B33Y 50/02*   (2015.01)
  *B33Y 10/00*   (2015.01)
  *G06F 119/18*  (2020.01)
  *B22F 10/30*   (2021.01)

(52) U.S. Cl.
  CPC ............... *G06N 3/08* (2013.01); *G06N 20/00* (2019.01); *B22F 10/30* (2021.01); *B33Y 10/00* (2014.12); *B33Y 50/02* (2014.12); *G06F 2119/18* (2020.01)

(58) Field of Classification Search
  CPC ...... G06F 30/23; G06F 2119/18; B22F 10/20; B22F 10/30
  See application file for complete search history.

NON-DIMENSIONALIZATION OF VARIABLES TO ENHANCE MACHINE LEARNING IN ADDITIVE MANUFACTURING PROCESSES

CROSS-REFERENCE TO RELATED APPLICATION

This application claims priority under 35 U.S.C. § 119(e) to U.S. Patent Application Ser. No. 62/762,398, filed on May 2, 2018, the entire contents of which are hereby incorporated by reference.

GOVERNMENT SUPPORT CLAUSE

This invention was made with partial government support under grant National Science Foundation CMMI 1335298. The government has certain rights in the invention.

FIELD OF THE USE

The present disclosure relates to enhancing machine learning, specifically to enhancing process mapping for additive manufacturing processes.

BACKGROUND

Additive manufacturing (AM), also known as direct digital manufacturing, refers to a wide range of processes for the direct fabrication of final parts, functional prototypes, or both using rapid prototyping technology. In AM, parts are fabricated by deposition using a heat source to locally soften or melt material in order to fuse added material with existing material. In some AM processes (e.g., those based on friction stir welding), the material is heated enough to allow fusion of added and existing material without melting. In other AM processes, the material is melted, and as the heat source is translated across the part being fabricated, a bead is formed consisting of a moving melt pool with solidified material behind it. Material is fed into the heated region (either directly or by other techniques such as via a powder applied to the surface of the part), and the part is built up by multiple passes to form the part shape. AM is used for Free Form Fabrication ($F^3$), which is the rapid manufacture of a complete part, and for additive manufacturing and repair (AMR), which adds one or more features to an existing component, either as a manufacturing step or for component repair. For instance, AM can be used to build parts from titanium alloys, which has applications in the aerospace and medical implant industries.

Machine learning can be used to build a mathematical model on sample data, generally referred to as training data. Machine learning can enable a computing system to make predictions or decisions about a system.

SUMMARY

The present disclosure describes methods and apparatus relating to process mapping for manufacturing processes. The techniques described in this disclosure are applicable to a wide range of thermal processing methods. For illustration purposes, the techniques will be described in the context of additive manufacturing involving a melt pool. In these additive manufacturing (AM) processes, a part is fabricated by deposition of successive beads of molten material. AM and other similar manufacturing processes are controlled by primary process variables, including, for instance, heat source power (P), translation speed (V) of the heat source, and feed rate of the source material (MFR).

This disclosure relates to methods for enhancing machine learning and artificial intelligence methods by first representing data in a non-dimensional form. Non-dimensionalization includes methods used to represent physical data that in the form of variables that do not have physical dimensions. Machine learning and artificial intelligence methods are used to represent large data sets that consist of many inputs to predict and classify output variables. Described herein a method of combining machine learning and artificial intelligence representations of non-dimensional data and produce data that results in more accurate predictions than analogous representations in dimensional form. This approach is general, but has been specifically applied to additive manufacturing, for constructing and using databases of simulation and/or experimental data, for enhancing representations of small data sets, in creating predictive tools, for developing new process parameter sets, and for interpreting data sets more effectively.

The techniques described herein provide a method for mapping an integrated (in time or space) characteristic of the thermal field, such as an average melt pool temperature or an evaporation rate from the melt pool. The resulting process maps may be used to identify combinations of process variables yielding the same values of the integrated characteristic or regions of processing space where the integrated characteristic (e.g., evaporation rate) is minimized or maximized. The techniques described herein also provide a method for using process maps generated for any thermal process characteristic (defined by temperatures, temperature derivatives, or temperature integrals) to evaluate sensitivity of that process characteristic to process variable changes. The use of the non-dimensionalized machine learning data can be applied across different processes acting across different values of process variables. For example, one can gather data from a laser powder bed additive process and then apply it to a small-scale welding-based AM process through extrapolation within the trained machine learning algorithm. For example, machine learning algorithms based on process maps can be used for the dimension of a region or other process outcome defined by a temperature (e.g., a melt pool width is a special case of a dimension of a region defined by the temperature equal to the melting temperature; the dimension of a region or other process outcome defined by a temperature gradient; the dimension of a region or other process outcome defined by a temperature integral; and a process outcome that may or may not be defined by a temperature, temperature gradient or temperature integral, such as surface roughness.

The techniques described herein are applicable to the deposition of beads of material used to build up complex three-dimensional shapes. The techniques can be applied to processes where no material is added. The techniques can be applied to map the response behavior of any thermal process characteristic in processes that do not include a melt pool. Although AM processes typically use a laser or electron beam as a heat source, the techniques can be applied to processes using any type of heat source.

The techniques for non-dimensionalization of variables to enhance machine learning in additive manufacturing processes described in this disclosure include one or more of the following advantages. Typically, modeling physical systems (such as process mapping for additive manufacturing) requires a relatively large amount of data relative to an amount of data that can be practically measured about the physical system. It is also difficult to capture all the physical mechanisms involved in this complex process. This is an obstacle to applying machine learning concepts to engineering problems, as opposed to computer science problems (such as image classification) which often have relatively more training data available. Typically, to generate an accurate model, an exhaustive number of physical tests are run to gather enough data samples to reduce errors of the model to acceptable levels. However, by applying non-dimensionalization transformations to input variables of machine learning algorithms, the amount of training data required to generate accurate predictions can be reduced, relative to using physical variables (e.g., dimensional variables) representing the physical system. This reduces a number of physical tests that are required to be performed to accurately model physical systems using machine learning.

Additionally, applying non-dimensionalization transformations to input variables of machine learning algorithms reduces a number of variables that are needed to execute the machine learning logic to output predictions of a given physical system with a given accuracy, relative to a number of dimensional variables needed for executing machine learning logic to output predictions of the given physical system with the given accuracy. A reduction in training data that is needed to operate the machine learning logic enables smaller databases to be used to provide the training data to the machine learning logic. The smaller set of training data that can be used enables a computing system that is executing the machine learning logic to generate predictions of the physical system using less computing resources in less time when compared to operating the machines learning logic on dimensional variables for the same physical system.

There are numerous applications for applying non-dimensionalization to represent a inputs to machine learning and artificial intelligence for modeling a physical system or process. As stated previously, training a machine learning engine with data including non-dimensionalized variables can be useful for modeling of any physical system. Machine learning and artificial intelligence methods are tools that are effective for representing large data sets that involve many input variables and output variables. As stated previously, if input and output variables are first non-dimensionalized, a number of variables for modeling the system can be reduced, and the reduced number of variables becomes easier to represent by machine learning and artificial intelligence methods. This means that smaller databases can be used to accurately model physical problems using machine learning and artificial intelligence methods.

The system can be used for creation of large databases to represent, for example, complex physical problems. By creating a database that has variables represented in non-dimensional form, the interpolation and extrapolation of data can become much more accurate for a given database size, or equally accurate using a database of smaller size. In another example, the system can be used for representing data with limited numbers of data points, or with large regions of sparse or missing data. In another example, the system can be used for predicting behavior of a physical system, either through interpolation or through extrapolation. Representation of data in non-dimensional form can make such predictions more accurate, relative to an accuracy of modeling the physical process or system by performing the same analysis using variables data directly.

In an aspect, a process for controlling an additive manufacturing process includes receiving a specification of at least one physical property of the additive manufacturing process for a material. The process includes determining, from the specification of the at least one physical property, a process outcome for fabrication of a part from the material. The process includes retrieving a process map including a set of process variables that are configured to cause the process outcome. The process map is generated by receiving a set of training data including a dimensionless parameter, the dimensionless parameter being a combination of at least two variables each representing a physical property of the additive manufacturing process, and applying the set of training data to machine learning logic to generate predictions of the process outcome for different values of the dimensionless parameter, the predictions of the process outcome from the process map. The process includes determining, from the process map, a value of at least one process variable for the additive manufacturing process to cause the process outcome in the material. The process includes and controlling the additive manufacturing process for the material by setting the at least one physical property to the value of the at least one process variable during fabrication of the part.

In some implementations, the process outcome is based on one or more of a melt pool geometry, a temperature gradient in the material, a temperature integral in the material. In some implementations, the process outcome comprises one of a dimension of the part or a surface roughness of the part.

In some implementations, controlling the additive manufacturing process further includes determining, based on the process map, a particular value for the at least one process variable for causing a melt pool to evaporate at a specific rate, adjusting heat in a region of the part based on the particular value, and causing the melt pool in the part to evaporate at the specific rate.

In some implementations, the process includes updating the process map by receiving values of measurements of an additive manufacturing process, each measurement corresponding to a variable for the additive manufacturing process, receiving data indicating a relationship between at least two of the variables, applying a transform to the values of the measurements of the at least two variables to generate additional values of the dimensionless parameter, updating the set of training data for the machine learning logic based on the additional values of the dimensionless parameter, and training the machine learning logic using the updated set of training data.

In some implementations, the dimensionless parameter is generated by selecting, based on the specification, at least two process variables of the additive manufacturing process that are physically related, and combining the at least two process variables into the dimensionless parameter. In some implementations, the dimensionless parameter is generated by selecting, based on the specification, at least one process variable of the additive manufacturing process and at least one material variable of the additive manufacturing process, the at least one process variable and the at least one material variable being physically related, and combining the at least one process variable and the at least one material variable into the dimensionless parameter. In some implementations, the dimensionless parameter comprises at least one of:

$$\eta = \frac{qv}{4\pi\alpha k(T_m - T_0)}, a = \frac{Av^2}{4\alpha^2}, w = \frac{Wv}{2\alpha}, \text{ and}$$

$$\eta = \frac{qv}{4\pi\alpha k(T_m - T_0)},$$

where q is a beam power, v is a beam velocity, α is a thermal diffusivity of the material, k is a thermal conductivity of the material, $T_m$ is a melting temperature of the material, $T_0$ is an initial temperature of the material, A is a melt pool area, a is a dimensionless parameter corresponding to the melt pool area, W is a melt pool width, w is a dimensionless parameter corresponding to the melt pool width, D is a melt pool depth, and d is a dimensionless parameter corresponding to the melt pool depth. The set of training data comprises measurements only for materials other than the material of the additive manufacturing process.

In some implementations, the at least one physical property comprises one of a type of the material, a feed type of the material, and a type of a heat source for heating the material. In some implementations, the at least one process variable is selected from a group including a power (P) variable associated with a thermal process, a translation speed (V) variable associated with the thermal process, a material feed rate (MFR) variable (or variable related to MFR) used in the thermal process, one or more structure geometry variables, and a structure temperature (T0) variable.

In some implementations, the machine learning logic comprises neural network regression logic.

In some implementations, generating the process map comprises interpolating temperature integrals based on applying the set of training data to the machine learning logic. In some implementations, the process includes generating the training data by performing a series of tests at different values of the at least one physical property, and measuring a melt pool geometry in the material for each of the different values of the physical property. In some implementations, the process map is generated from the set of training data including values for a first alloy, and where the process map includes one or more predictions of a melt pool geometry for causing the process outcome in a second alloy that is different from the first alloy.

In an aspect, a computer-implemented method for training a machine learning engine for modeling of a physical system includes receiving process data representing measurements of a physical system, the process data including a set of variables, each variable having a value corresponding to each measurement of the physical system for that variable. The process further includes receiving a specification of the physical system indicating a relationship between at least two variables of the set of variables. The process further includes applying a transform to values of the at least two variables to generate a dimensionless parameter having a parameter value corresponding to each measurement of the physical system for the at least two variables. The process further includes generating a set of training data for the machine learning engine, the set of training data including the dimensionless parameter. The process further includes training the machine learning engine using the set of training data, the machine learning engine configured to output a prediction of a value of a physical effect of the physical system for values of the variables that are not included in the process data.

In some implementations, the process includes applying logic of the machine learning engine to a set of unmeasured values of the set of variables by applying one of neural network regression or piecewise power regression; and generating, in response to the applying, a set of prediction values for the physical effect, the prediction values corresponding to the unmeasured values of the set of variables. Generally, the prediction of the physical effect has an accuracy within a given threshold, and where a first size of the set of training data including the dimensionless parameter is smaller than a second size another set of training data that does not include the dimensionless parameter and that trains the machine learning engine to generate the prediction having the accuracy within the given threshold.

In some implementations, training the machine learning engine using the set of training data that includes the dimensionless parameter requires less processing time than training the machine learning engine using the other set of training data that does not include the dimensionless parameter.

In some implementations, the physical system comprises an additive manufacturing system, and where the physical effect comprises one of a melt pool width of a material, a melt pool depth of the material, and a temperature gradient of the material. A variable of the set of variables corresponds to one of a deposition rate, a beam power, a preheat temperature, and a beam travel speed. In some implementations, the dimensionless parameter is a function of a ratio of at least two variables of the set of variables. In some implementations, the dimensionless parameter represents a structure of the physical system.

Particular implementations of the subject matter described in this disclosure may be implemented to realize one or more of the following potential advantages. In general, the generation of process maps may enable the relationships between process variables and final part quality to be understood with minimal experimentation or simulation. The processing knowledge that may be gained from process mapping techniques can be extended over a wide range of process variables, thus providing a way to compare results from different pieces of equipment, different manufacturing techniques, or both. Furthermore, process mapping techniques can be used as the basis for an evolving database characterizing the deposition of complex shapes. The identification of directions in processing space yielding maximum changes in process characteristics can advance efforts to minimize process outcome variability caused by fluctuations in process variables.

Details of one or more implementations are set forth in the accompanying drawings and the description below. Other features, objects, and advantages will be apparent from the description, the drawings, and the claims.

DETAILED DESCRIPTION

Although the techniques described in the present disclosure are applicable to a wide range of modeling of physical systems, various implementations will be described below in the context of additive manufacturing involving a melt pool. While specific implementations are described, other implementations may exist that include operations and components different than those illustrated and described below. For example, the techniques described herein can be used to develop AM or direct digital manufacturing processes that involve the feeding of material in wire or powder or other form into a melt pool. The techniques described herein can be applied to a variety of processes involving the formation of a melt pool, such as welding processes (even if not used to build a shape). These techniques may also be applied to other physical processes that do not involve the direct feeding of material into the melt pool, such as (but not limited to) powder bed am processes, and to analogous welding processes.

More generally, the non-dimensionalization of variables can be used to enhance machine learning for applications in any system, especially physical systems in which training data related to the system is sparse. The non-dimensionalization of variables reduces a number of the variables that are needed to execute machine learning logic to output predictions for a physical system, relative to a number of dimensional variables needed to execute the machine learning logic to output the predictions for the physical system with approximately equal accuracy.

Figure 1:
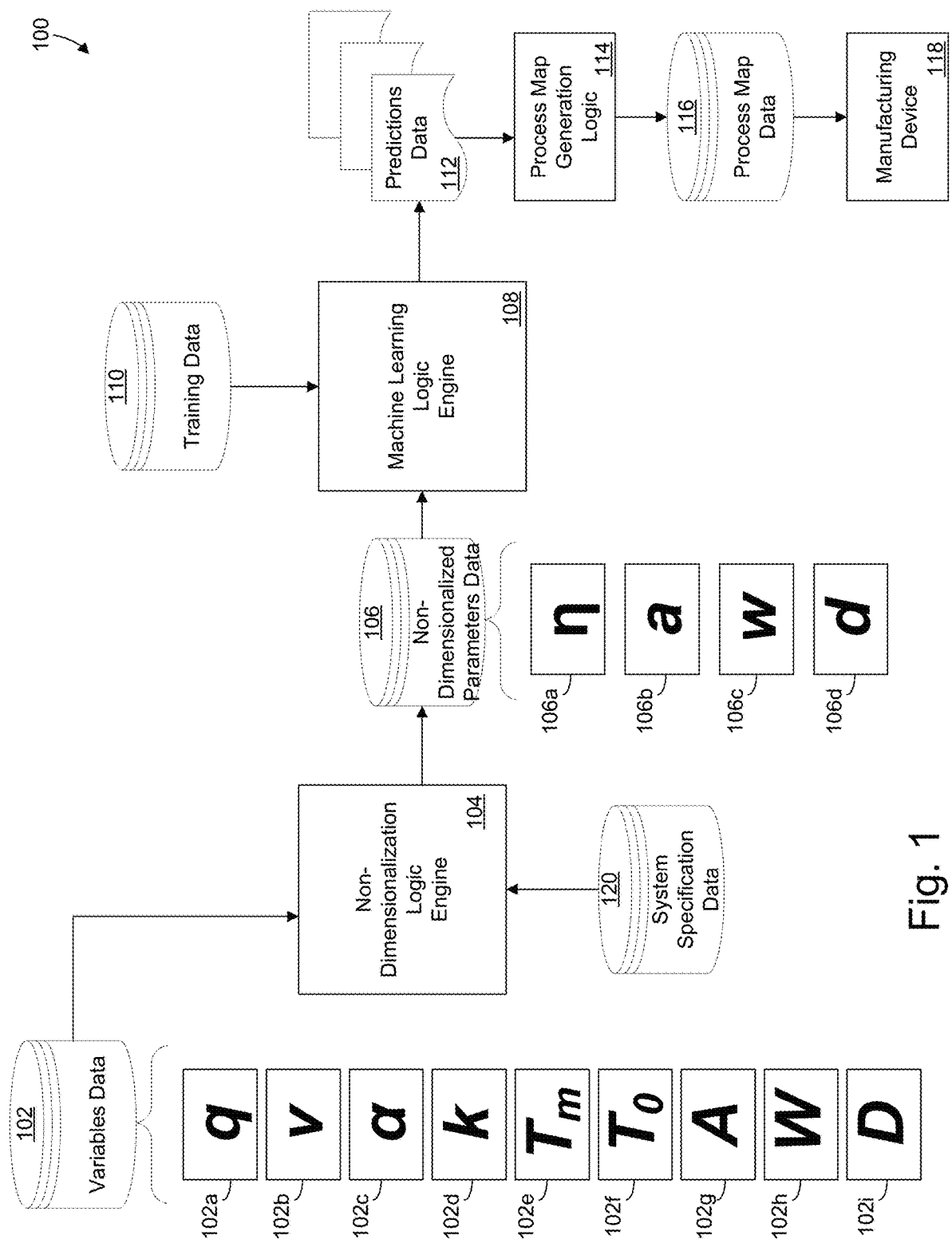
FIG. 1 is a block diagram showing an example system for performing non-dimensionalization of variables to enhance machine learning in additive manufacturing processes.

FIG. 1 is a block diagram showing an example system 100 for performing non-dimensionalization of variables to enhance machine learning in additive manufacturing (AM) processes. The system 100 includes a non-dimensionalization logic engine 104 and a machine learning logic engine 108. In some implementations, the system 100 includes a computing system 1412, described in relation to FIG. 14. Generally, the system 100 is configured generate a process map (e.g., process map data 116) from experimental data (e.g., variables data 102). The process map includes a model of how changes to one or more inputs to a physical process (e.g., process variables, materials variables, etc.) affect an output of the physical process or process outcomes (e.g., melt pool dimensions in the context of additive manufacturing). Generally, in this description, process variables include process inputs, and physical outcomes include process outcomes. For example, during a manufacturing process, the process map can be analyzed to determine what settings should be applied to a system to get a desired result. Examples of process maps and data used for generation of the process maps are described in relation to FIGS. 2-6B. However, while additive manufacturing is described as a physical context for performing non-dimensionalization of variables to enhance machine learning, these techniques can be used for modeling other physical systems in a similar way.

The variables data 102 includes values of inputs to a physical system. Generally, the variables data 102 includes values of physical measurements of a physical system. As such, the values of the variables data 102 each are associated with at least one physical quantity (e.g., a dimension, material property, or other such physical quantity). In the context of additive manufacturing, example variables 102a-i are shown in FIG. 1. Variable 102a represents a power absorbed by a material of the AM process. Variable 102b represents a travel velocity of a heat source. Variable 102c represents a thermal diffusivity of the material. Variable 102d represents a thermal conductivity of the material. Variable 102e represents a melting temperature of the material. Variable 102f represents an initial temperature of the material. Variable 102g represents a melt pool area. Variable 102h represents a melt pool width. Variable 102i represents a melt pool depth. The list of example variables 102 is not exhaustive, and can include any physical values associated with a physical process or physical system. Variables data 102 can be generated based on physical measurements received during tests of the physical system in order to generate the model of the physical system (e.g., the process map for AM processes). An exhaustive set of tests for every possible combination of the variables of the variables data 102 is generally not feasible. Thus, the non-dimensionalization of the variables by the non-dimensionalization logic engine 104 can facilitate extraction of relationships between the variables. This can reduce a number of tests (and also the amount of variables data 102 and size of the database including the variables data 102) needed to model the physical system, relative to using the variables data 102 in the machine learning logic engine 108 directly.

The non-dimensionalization logic engine 104 includes a logic engine for performing non-dimensionalization transforms on variables data 102. Non-dimensionalization generally is a partial or full removal of units from an equation involving physical quantities by a suitable substitution of variables. The non-dimensionalization logic engine 104 receives the variables data 102 (e.g., from a database or other storage). The non-dimensionalization logic engine is configured to perform a transform to the values of the at least two variables to generate a dimensionless parameter having a parameter value corresponding to each measurement of the physical system for the at least two variables of the variables data 102.

Generally, the transforms that are performed are system specific. A specification can include system specification data 120 that specifies relationships between the variables 102 for a particular system. For example, non-dimensionalization emphasize characteristic properties of a physical system. For example, if a physical system has an intrinsic resonance frequency, length, or time constant, non-dimensionalization can recover these values. The relationships of the specification data 120 specify how to combine two or more of the variables of the variables data 102 to generate non-dimensionalized parameters data 106 including non-dimensionalized variables. The non-dimensionalization logic engine is thus configured to select, based on the specification, data 120, at least two variables 102 of the (e.g., of the AM process) that are physically related and combine the at least two process variables into a dimensionless parameter (e.g., non-dimensionalized parameters data 106).

Generally, not all of the variables of the variables data 102 need to be non-dimensionalized. The representation used by the machine learning algorithm can use a mix of dimensional and non-dimensional variables. For example, transforming even just one variable to a non-dimensional form (and leaving remaining variables unchanged) increases system performance as indicated previously.

For an AM process, examples of non-dimensionalization of the variables data 102 are shown. Transforms for the variables data 102 can generate non-dimensionalized parameters data 106a, 106b, 106c, and 106d based on the following relationships, respectively:

$$\eta = \frac{qv}{4\pi\alpha k(T_m - T_0)}, a = \frac{Av^2}{4\alpha^2}, w = \frac{Wv}{2\alpha}, \text{ and}$$

$$\eta = \frac{qv}{4\pi\alpha k(T_m - T_0)},$$

where q is a beam power, v is a beam velocity, $\alpha$ is a thermal diffusivity of the material, k is a thermal conductivity of the material, $T_m$ is a melting temperature of the material, $T_0$ is an initial temperature of the material, A is a melt pool area, a is a dimensionless parameter corresponding to the melt pool area, W is a melt pool width, w is a dimensionless parameter corresponding to the melt pool width, D is a melt pool depth, and d is a dimensionless parameter corresponding to the melt pool depth. These relationships can be determined from analyzing the physical system or by reviewing available literature (if applicable).

The non-dimensionalized parameters data 106 is received by the machine learning logic engine 108. The machine learning logic engine 108 is configured to receive the non-dimensionalized parameters 106 as features. In some implementations, because the values of the non-dimensionalized parameters 106 are dimensionless, the values can be received by the machine learning logic engine 108 without first further processing (e.g., scaling, etc.) the parameters. In some implementations, the non-dimensionalized parameters can be normalized if necessary for the particular logic of the machine learning engine 108.

In some implementations, the non-dimensionalized parameters 106 can be input values for a neural network of the machine learning logic engine 108. Weights of the synapses of the neural network can be trained with the training data 110. As previously discussed, the training data 108 is generated based on measurements or experiments of the physical system in which values of one or more of the variables data 102 are set as inputs and other values of the variables data 102 are measured in response. The training data 110 can include one or both of measurements of variables 102a-102i of the variables data 102 and non-dimensionalized parameter values 106a-106d of the non-dimensionalized parameters data 106.

The machine learning logic engine 108 is configured to interpolate and extrapolate the results of these experiments into a model of the physical system. For example, a number of experiments can be performed for a particular material in the AM process. Rather than repeating the experiments for a second material, material properties of the second material can be substituted into the model that was trained by the experiment data from the first material to generate a prediction of how the system could respond to including the second material. Examples of particular machine learning logic, and the results achieved, are described in relation to FIGS. 8A-11. As described above, many different kinds of machine learning logic can be used, such as a support vector machines (SVM), decision trees, neural networks, naïve Bayes, nearest neighbor, linear regression, and so forth. The non-dimensionalized parameters 106 are the features data that are received for each of these machine learning approaches.

The machine learning logic engine 108 processes the non-dimensionalized parameters data 106 to generate one or more predictions of predictions data 112. The predictions data 112 generally includes one or more probabilities (e.g., percentages) related to physical values of the system or process that is modeled. In some implementations, the predictions data 112 can be adjusted to represents dimensional values related to the process or system being modeled by the system 100. For example, the predictions data 112 can include a predicted value (or values) of a variable of the variables data 102 given one or more other values of other variables of the variables data 102. In some implementations, the predictions data 112 includes predictions for physical quantities that are not included in the variables data 102.

The process thus far described can be repeated for different values of the variables data 102 to generate a set of predictions of the predictions data 112. Predictions for many different combinations of the variables data 102 values without requiring physical experiments for each combination. In this way, a relatively small set of experiments can provide the training data 110 as a basis for generating a relatively large set of predictions of the predictions data 112. The system 100 is configured to combine the predictions data 112 for the different combinations of the variables data 102 (parameterized into non-dimensionalized parameters 106 and analyzed by the machine learning logic engine 108) into a process map, stored as process map data 116. The process map data 116 can be provided to a manufacturing device 118 for setting variables of the physical AM process during AM manufacturing. For example, the manufacturing device 118 can reference the process map data 116 to determine what settings to apply to the process or system being performed in order to generate a desired result. Details of example process maps and their use during AM processes are subsequently described in relation to FIGS. 2-6B.

The system 100 can use non-dimensionalized data 106 for the machine learning logic engine 108 across different processes, acting across different values of process variables and/or material variables of variables data 102. For example, data can be gathered from experiments for a first process (e.g., for a laser powder bed additive process) to generate training data 110. That training data 110 can be applied for generating predictions data 112 for a second, different process (e.g., for a small-scale welding-based AM process) through extrapolation within the trained machine learning algorithm. In this way, materials can be substituted so that experimentation with a first allow in an AM process can be used to generate training data 110 for a second, different alloy. Other variables of the variables data 102 can be substituted provided there is data relating the new variable to the existing variables (e.g., by a specification). In some implementations, this can simply be substituting a first physical value for a second, different value for a variables (e.g., a materials variable).

Figure 2:
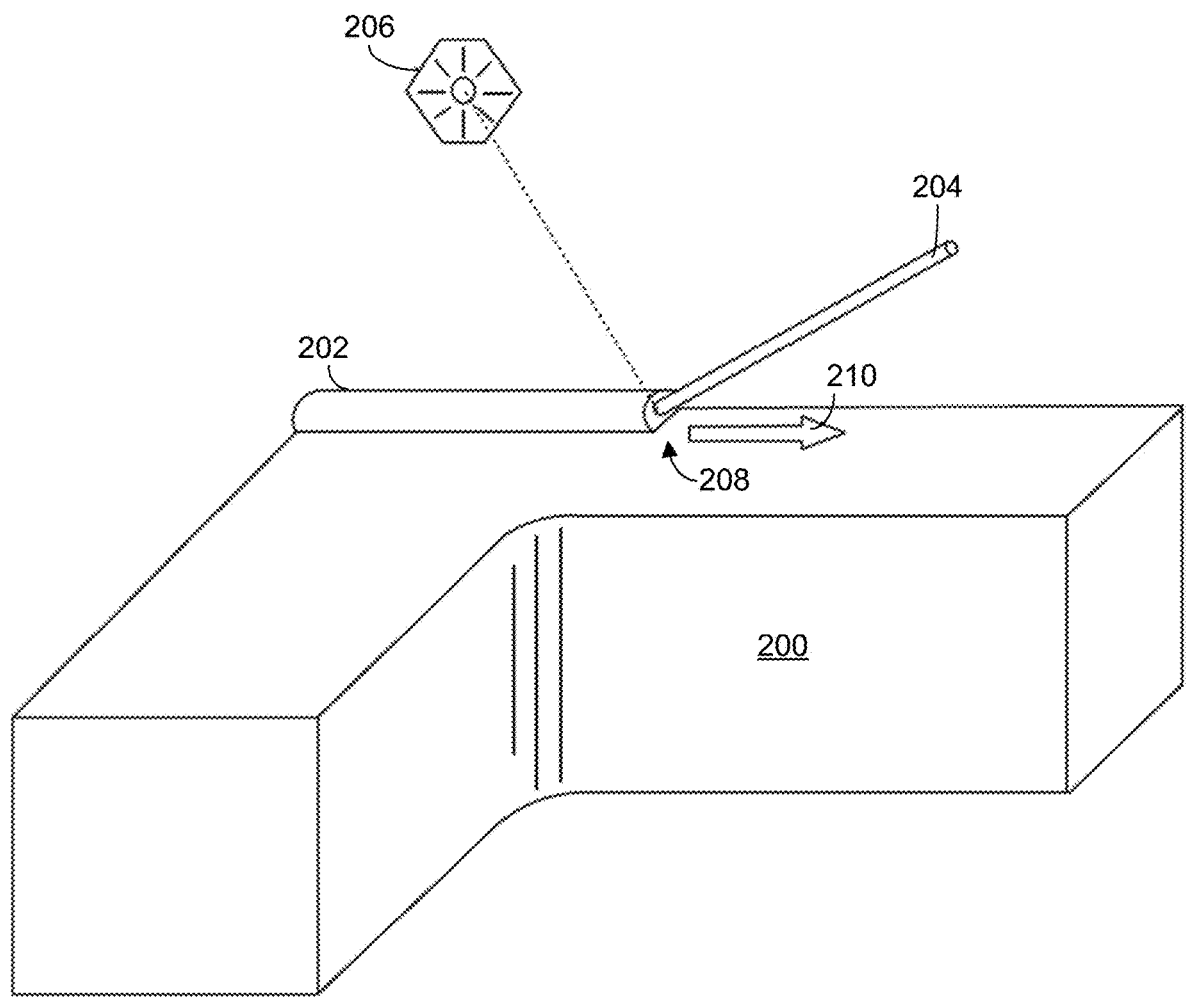
FIG. 2 is a block diagram showing an example of geometry deposition using a beam-based additive manufacturing process.

FIG. 2 is a block diagram showing an example of geometry deposition using a beam-based additive manufacturing process. In such an AM process, a structure or part 200 is fabricated by deposition of successive beads 202 of molten material. The material is provided from a material source 204, such as a wire feed (as shown), a powder feed, or a powder bed. A heat source 206, such as an electron beam, a laser beam, or an electric arc, melts the material source 204 to generate the bead 202 while melting some of the top surface 208 of the part 200. The heat source 206 is translated relative to the part 200 (or the part is translated relative to the heat source) to cause deposition of beads in a desired geometry to form the part 200.

A melt pool itself is not required. For instance, in beam-based surface heat treating processes, in which a beam is rapidly moved across a surface to alter near-surface microstructure without melting, the techniques described herein can be used to map average temperatures within a zone surrounding the heat source, and the sensitivity of those average temperatures to fluctuations in heat source power. Finally, the type of heat source involved is also general. For instance, different welding processes use a variety of mechanisms for heating, including a metal arc, gas combustion, electrical resistance, friction, and ultrasonics. The techniques described herein can be applied to each of these and others.

For a single specified material or a specified combination of materials, the primary process variables that control AM processes are power (P) of the heat source 206, the translation speed (V) of the heat source 206, the material feed rate (MFR, in units of volume per time) of the material source 204 or a related variable, one or more process variables related to the geometry being deposited and the temperature ($T_0$) of the part 200 away from the location 208 of the heat source on the part. These process variables also control other similar manufacturing processes, such as welding processes (including those that do not involve melting of the material) and beam-based surface heat treating processes (which would involve the limiting case of MFR=0). In addition, many secondary process variables and conditions can affect processing, including, for instance, beam focus, wire or powder particle diameter, deposition environment (e.g., deposition in a vacuum or in an inert gas environment), and other variables. While MFR is not used as an example variable in the data provided in relation to FIGS. 6A-11, it is a possible variable that can be used.

The techniques described herein provide a method for mapping the role of primary process variables in determining thermal field characteristics resulting from deposition of a bead, as secondary process variables are held constant. The techniques can also be used in cases where secondary process variables vary, but they are determined by the primary process variables. In cases where secondary process variables change independently or randomly, the techniques can help identify when they affect integrated thermal field characteristics by first separating out the role of the primary process variables. Once this is done, studies of secondary process variables can be performed by adding them to the process variable list and mapping their influence on integrated or differential thermal field characteristics. The primary and secondary process variables can be included in the variables data 102 of the system 100. In some implementations, once the roles of primary process variables are determined experimentally, the effects of adjusting secondary process variables can be mapped using the models developed by the machine learning logic engine 108.

The techniques described herein are applicable to the deposition of single beads of material onto an existing large plate. These techniques can also be applied to the fabrication of more complex three-dimensional shapes. Although AM processes are typically used to fabricate metal parts, the techniques described herein can be used to support the fabrication of parts of any material compatible with thermal AM processing, welding, beam-based surface heat treating, or other similar manufacturing processes. As described in this disclosure, process maps are developed for a single material or a specified combination of materials. If the material or material combination is changed, new process maps should be developed, such as using predictions data 112 generated by the machine learning logic engine 108.

Figure 3:
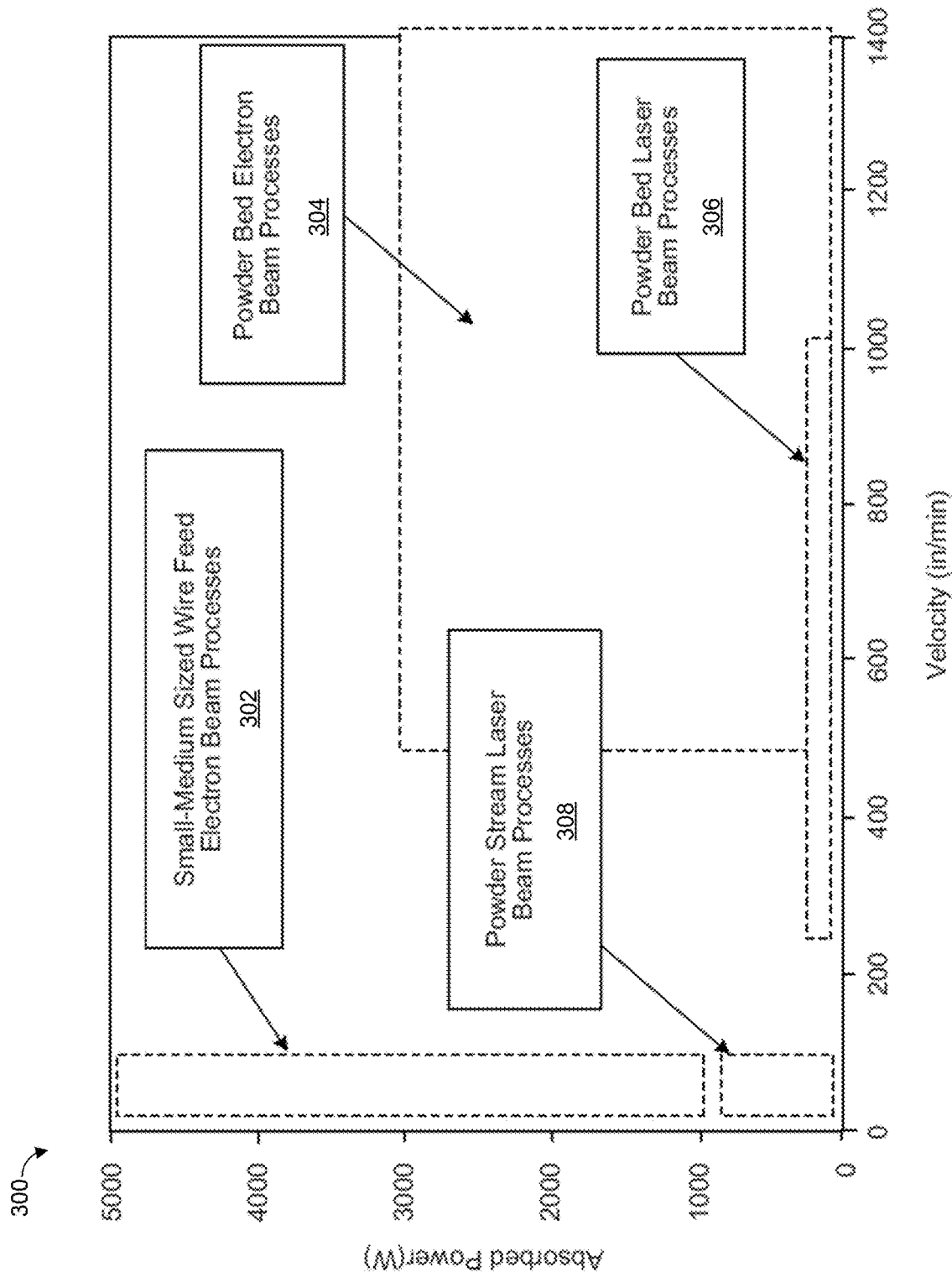
FIG. 3 is a plot of approximate ranges of power and velocity used in examples of additive manufacturing processes for metals.

FIG. 3 is a plot 300 of approximate ranges of power and velocity used in examples of additive manufacturing processes for metals. Many types of manufacturing processes spanning a wide range of process variables fall under the purview of AM processing. For instance, AM processes include small- and medium-scale electron beam wire feed processes 302, electron beam powder bed processes 304, laser power bed processes 306, and laser powder stream processes 308. Large-scale electron beam processes operating at beam powers of, e.g., 20 kW or more (not shown in FIG. 3) may also be considered to be AM processes. The techniques described herein are applicable to the full range of process variables used in these and other AM processes.

Figure 4:
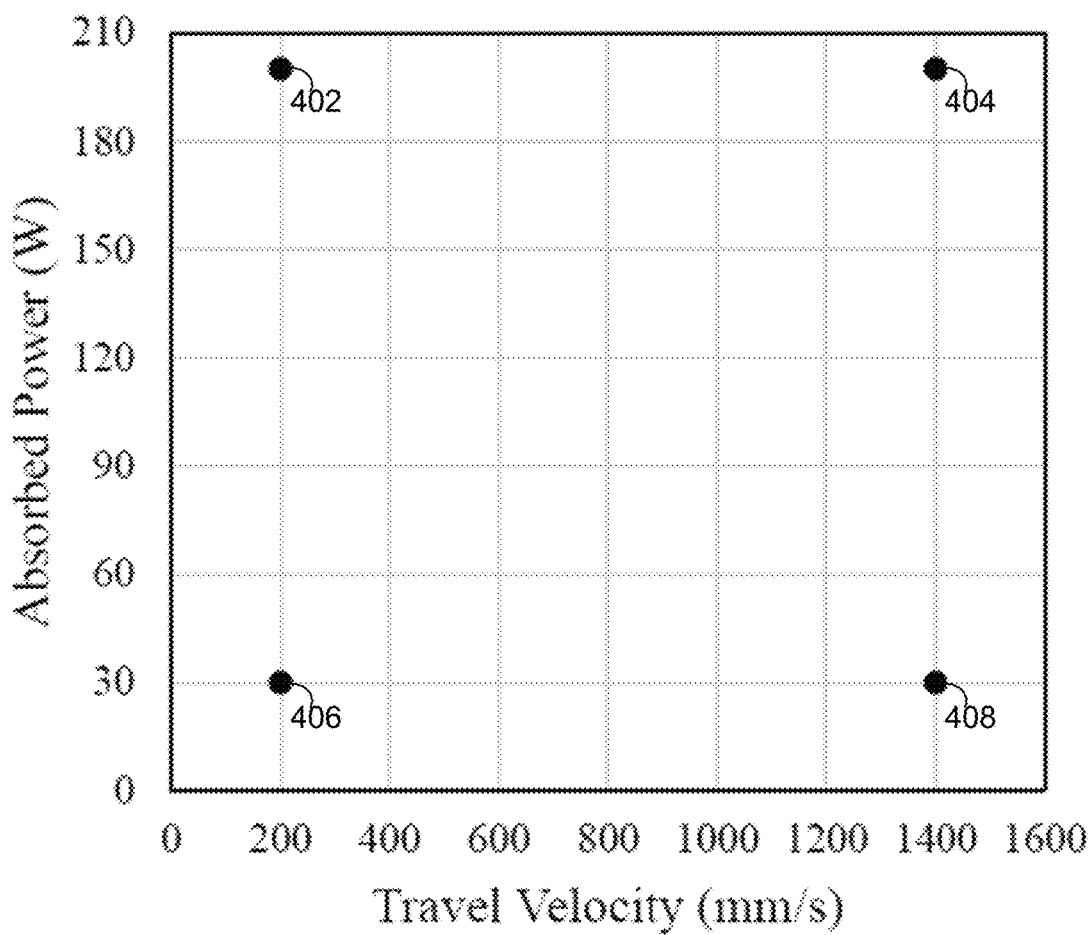
FIG. 4 is a plot of approximate ranges of power and velocity uses in examples of additive manufacturing processes for metals.

An example is subsequently described that uses AM processes as an example of improving modeling of a physical process or system with non-dimensionalization of inputs to machine learning. FIG. 4 is a plot of approximate ranges of power and velocity uses in examples of additive manufacturing processes for metals. Analytical solutions have been proposed for temperature distribution in the case of a moving point heat source. However, in reality, the heat source is distributed, rather than a point source. Beam spot size is not explored in detail as a process variable. A solution for the temperature distribution resulting from a moving point heat source on a semi-infinite solid is given by Equation 1. This solution is developed for the conduction based heat transfer (which can be found in the literature).

$$T - T_0 = \frac{q}{2\pi k} \frac{\exp^{-\lambda v(\xi+R)}}{R} \quad (1)$$

where, T is a temperature of the material, $T_0$ is the initial temperature of the material, q=is the power absorbed by the material, v is the travel velocity of the heat source, k is the thermal conductivity of the material, $$\frac{1}{2\lambda}$$

is the thermal diffusivity of the material, $\xi$ is the distance of the point of interest from the point source, and $R=\sqrt{\xi^2+y^2+z^2}$.

From this equation, it can be identified that the variables (e.g., variables data 102) considered in this solution are beam power, travel velocity, initial temperature of the solid, and thermophysical properties of the materials (e.g., thermal conductivity, density and specific heat). Here, several assumptions are made, such as that (i) thermophysical properties do not change with temperature, and (ii) beam power and travel speed are constant. Apart from those two assumptions, it is also important to note that the latent heat effect, surface heat losses, fluid flow inside the melt pool (weld pool) and effects of powder such as size distribution and layer thickness are not included in the derivation of the analytical equation. Thus, when applying the this equation to the additive manufacturing processes, it is important to adjust the solution based on a finite element models or experiments where some of the limitations of the analytical solution are addressed. This can be done by adding additional information to the specification data 120 of FIG. 1 or otherwise providing additional training data 110 to the machine learning logic engine 108. Any inaccuracies caused by these assumptions can be mitigated or eliminated by experimental data of the training data 110. Equation 1 can be adjusted by changing the temperature at which the thermophysical properties are considered to match the analytical solution to the finite element model during operation of the machine learning logic engine 108 to predict melt pool geometry, cooling rates and thermal gradients. Similarly, absorptivity of the material is also a variable which can be modified to adjust the Equation 1 when comparing with simulations or experiments.

Finite element simulations address some of the assumptions used in the equation 1 if not all of the assumptions. Here, two models are compared to emphasize the fact that using Equation 1 without any prior information can be misrepresentative. The comparison consists of two parts. Firstly, properties at the standard room temperature are used in Equation 1 and the resulting melt pool depth is compared with the melt pool depth from the simulations. Properties at room temperature are considered in this analysis because they are easily available when compared to temperature dependent properties. After that, the temperature at which the properties are to be used is adjusted until the melt pool depth from Equation 1 matches with that predicted by the finite element simulations. In this comparison, the properties of the material which are adjusted in the analytical solution are thermal conductivity, density and specific heat. This comparison is performed at four different regions in the process space (power-velocity) space as shown by points 402, 404, 406, and 408 of FIG. 4. These four points 402, 404, 406, and 408 represent extreme values in the process window. Since, both the models include absorbed power, absorptivity is not considered as a process variable in this comparison. To eliminate the need to add one more variable, comparison of Equation 1 is limited to the finite element model. Temperature dependent properties are obtained from available data provided for IN718 material.

Table 1 outlines the results from the comparison between the melt pool depths predicted by the analytical model and a finite element model. Equation 1 fitted temperature is chosen such that the properties at this temperature will result in less than 5% difference when compared to the simulation depths. This difference can be reduced further by adjusting the fitting temperature though the temperatures in the table are limited to less than 5% difference. It can be observed from the table that the difference between the melt pool depths from the simulation and Equation 1 is higher at room temperature properties when compared to the difference at the fitted temperature.

TABLE 1

Comparison between melt-pool areas estimated from simulations and Equation 1 (Rosenthal Solution).

| Absorbed Power (W) | Travel Velocity (mm/s) | Simulation Depth (in) | Rosenthal Solution for Depth using Properties at Room Temperature (in) | Difference (%) | Fitting Temperature (K) | Rosenthal Solution for Depth using Properties at Fitted Temperature (in) | Difference (%) |
|---|---|---|---|---|---|---|---|
| 30 | 200 | 2.7E−03 | 3.5E−03 | 31% | 1000 | 2.7E−03 | 1% |
| 30 | 1400 | 1.1E−03 | 1.4E−03 | 24% | 1100 | 1.1E−03 | 2% |
| 200 | 200 | 7.7E−03 | 9.3E−03 | 21% | 1100 | 7.6E−03 | 1% |
| 200 | 1400 | 3.0E−03 | 3.5E−03 | 17% | 1000 | 3.0E−03 | 1% |

It is evident that the Equation 1 solution for depth is higher than the simulation depth in all the cases. This can be explained by the fact that with increase in temperature, thermal conductivity of IN718 increases. However, this is not accounted for by considering the room temperature conductivity in the analytical solution which led to over estimation of melt pool depth. This case study is a good example to show that, (i) room temperature properties are not suitable to estimate the melt pool dimensions using Rosenthal solution for laser melting of IN718 and (ii) fitting temperature slightly changes with the location in the process space. In summary, depending on the process variables and material properties, the fitting temperature varies. For instance, in AlSi10Mg, thermal conductivity decreases with an increase in temperature. This might affect the fitting temperature choice. This means, in order to use Equation 1 as a model, the material properties have to be adjusted every time when the process variables or the material properties change. In order to do this, simulations have to be performed at different process variable combinations for every material of interest which can be tedious and time consuming. Thus, it is important to have a framework that utilizes information from the existing simulations and experiments in order to predict the melt pool characteristics for a new alloy system or for a new process variable combination, as described previously in relation to FIG. 1.

In some implementations, when a physical process involve temperature-dependent properties, the system 100 can be configured to select a temperature at which to choose all of the variables, and the temperature choice made can be one that works best in collapsing the data. However, other methods are possible for choosing the properties to be used in non-dimensionalizations can also be used. The properties used in the non-dimensionalization can be a random combination of properties loosely based on the material properties that seem to collapse the data best. For example, Equation 1 may be adjusted by changing the temperature at which values of the variables are based.

Figure 5:
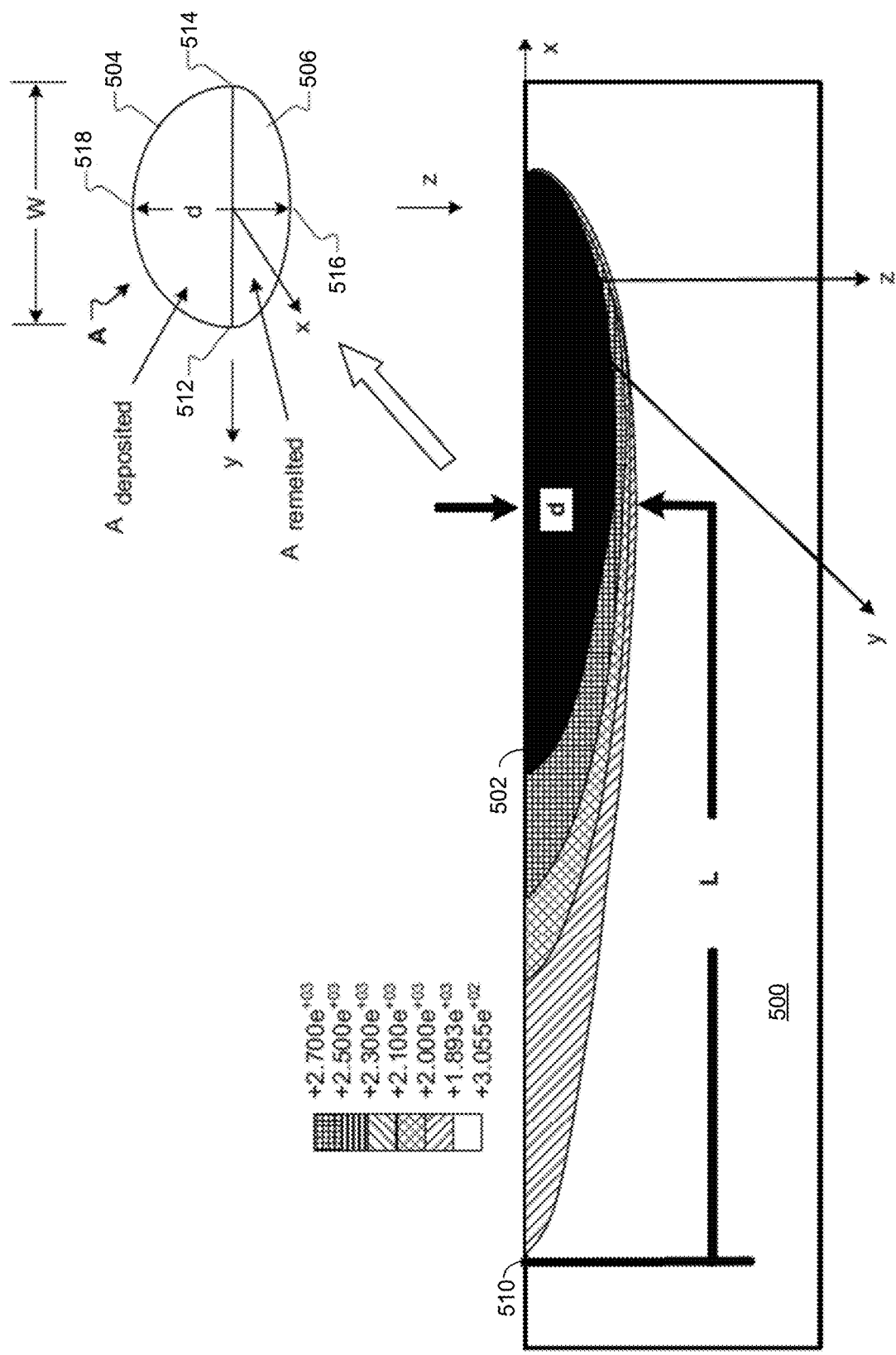
FIG. 5 is a diagram of melt pool dimensions and melt pool locations.

FIG. 5 is a diagram of melt pool dimensions and locations for an AM process, such as described in relation to FIGS. 1-4. When a bead of material is deposited onto a surface of a part 500 in an AM process, a melt pool 502 is formed including the molten bead 504 of material (seen in cross section) and any material 506 of the surface that has melted as a result of the bead deposition. A side-view cross-section of a melt pool 502 on the surface of a part 500, derived from a finite element model, depicts melt pool dimensions that may be relevant to process control and the definition of integrated thermal quantities. In FIG. 5 the melt pool 502 is moving in the positive x direction (i.e., the direction of V).

In general, when a local heat treatment is applied to a region of a part (e.g., via a moving heat source), a thermal field is created in the part. In some instances, some of the thermal field is melted; in other instances, the temperatures of the thermal field are raised relative to the temperature of the surrounding material, but melting does not occur. In the following description, reference is made to the dimensions of the melt pool; however, the dimensions of the thermal field may be treated similarly to the dimensions of the melt pool. In FIG. 5, the maximum melt pool cross-sectional area, A, is the area of the melt pool 502 normal to the x-axis (and thus normal to the direction of travel of the melt pool 502), at the deepest point of the melt pool 502. The melt pool length, L, is the length of the melt pool 502 from the x location of A to a location 510 of the trailing tip of the melt pool 502. The melt pool depth, d, is indicative of the maximum depth of the melt pool 502. In some instances, d is the actual maximum depth of the melt pool 502. In other cases, d is an effective depth of the melt pool 502 as calculated from A using the formula $d=\sqrt{2A/\pi}$. The maximum melt pool cross-sectional area, A, equals the cross-sectional area of the deposited bead 504 ($A_{deposited}$) plus the cross-sectional area of the material 506 melted on the surface of the part 500 ($A_{remelted}$). The melt pool length, L, relates to the shape of the solidification front behind the melt pool 502. In some cases, a dimensionless variable, L/d, is used, which relates to the aspect ratio or shape of the trailing end of the melt pool 502.

An integrated thermal field characteristic is a quantity determined by integrating thermal field quantities. Examples of integrated thermal field characteristics include (but are not limited to) the average temperature over an area or volume of material at a single time or the average temperature over time at a single location. One example of an integrated thermal characteristic is the average temperature within the melt pool. The average temperature within the melt pool may be calculated as the three-dimensional integral of temperatures over the volume of the melt pool (at a specified time) divided by the melt pool volume. Another example of an integrated thermal characteristic is the average temperature across an area, such as the melt pool cross-sectional area A. The average temperature across the melt pool cross-sectional area may be calculated as the two-dimensional integral of temperatures over A divided by A. Yet another example of an integrated thermal characteristic is the average temperature over time at a specified location, such as on the part surface (z=0) at a specified surface location. The average temperature at the location may be calculated as the one-dimensional integral of temperatures at that location over the time period of interest, divided by the total elapsed time. Many other versions of integrated thermal field characteristics combining integrals over time and space could be of interest in characterizing AM and other similar processes. This is described in detail in U.S. application Ser. No. 14/776,446, filed Feb. 4, 2016, the contents of which are incorporated herein in entirely by reference.

The process mapping techniques described herein enable mapping of the role of primary process variables of variables data 102 on thermal field characteristics. First, however, the primary process variables determining the thermal field characteristic must be established. In some implementations, the primary process variables are P, V, MFR, one or more variables describing the geometry being mapped, and the part temperature away from the heat source, $T_0$. These variables can be combined into non-dimensionalized variables as similar to the approach described in relation to FIG. 1.

The part (also referred to as a material) temperature, $T_0$, can be due to active preheating of the part through external means or can be due to heat build-up from the heat source, e.g., caused by prior deposition of material. Part temperature away from the heat source is easily monitored in real time. Any location may be selected for monitoring $T_0$, provided the location is away from the local thermal field of the heat source and is consistent throughout the tests (simulations or experiments).

In other implementations, an alternative primary variable, $\gamma$, can be used in place of the MFR. The variable $\gamma$, which represents the deposited to re-melted area ratio ($\gamma=A_{deposited}/A_{remelted}$), directly relates the size of the added bead of material to the size of the material melted in the existing part and thus relates the effect of those sizes on heat transfer into the part. The variables $\gamma$ and MFR are related. Specifically, $MFR=V*A_{deposited}$, where $A=A_{deposited}+A_{remelted}$. From these relationships, it can be determined that $$MFR = V * A / \left(1 + \left(\frac{1}{\gamma}\right)\right).$$

In manufacturing applications, $\gamma$ is bounded by a value of 0 (for no added material) to infinity (for no remelting of the substrate material). When process mapping is used to determine the role of process variables and local bead geometry on melt pool dimensions, the use of $\gamma$ may be more relevant. For manufacturing control, MFR may be the more relevant variable. Alternative process variables related to MFR may also be used for process mapping. For example, the variable $\phi=A_{deposited}/A$ may be used. The variable $\phi$ takes on a role similar to $\gamma$, except that $\phi$ has an operating range from 0 (for no added material) to 1 (for no re-melted substrate material).

Figure 6A:
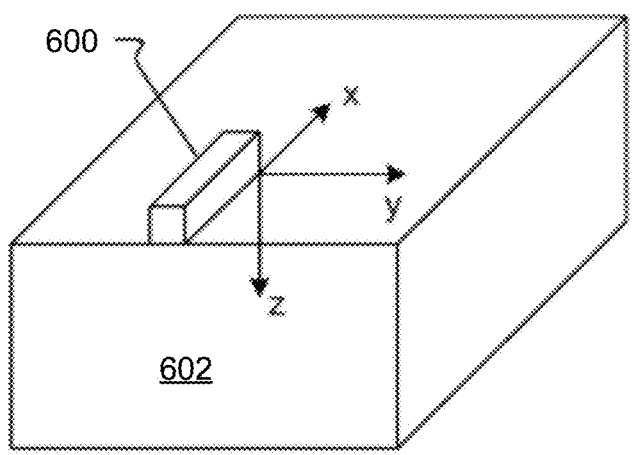
FIG. 6A is a perspective view representation of a single bead geometry.
Figure 6B:
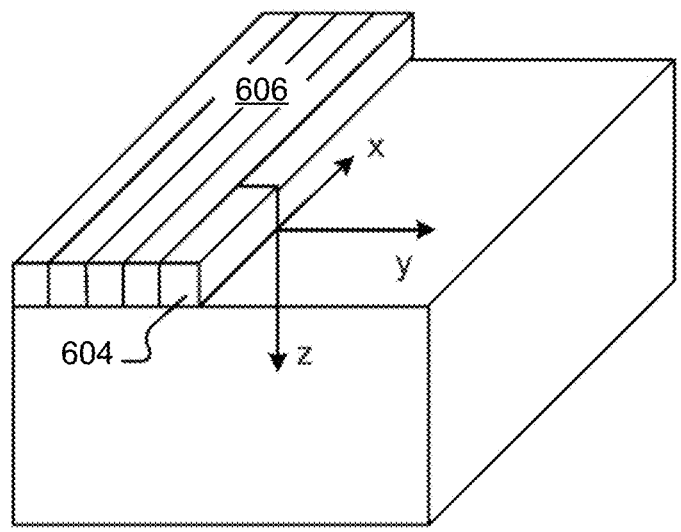
FIG. 6B is a perspective view representation of a sequential bead geometry.

Process mapping of the deposition of complex 3-D shapes can be decomposed into combinations of simpler, commonly fabricated geometries, each of which may have one or a series of associated process maps. FIGS. 6A-6B are block diagrams showing examples of some commonly fabricated geometries or features. The geometries shown in FIGS. 6A-6B are provided for illustration. Other commonly fabricated geometries are described in International Application No. PCT/US2013/055422 and International Application No. PCT/US2012/048658. In the geometries shown in FIGS. 6A-6B, the coordinate origin is taken to be the location where the heat source is positioned, and deposition proceeds in the positive x direction. In the geometries shown in FIGS. 6A and 6B (referred to as "steady-state geometries"), the geometry is constant in the deposition direction (away from free edges of the geometry). Alternatively, in a transient geometry, the geometry changes in the deposition direction. Process maps for each of these geometries can be developed as described previously using non-dimensionalization of variables data 102, described in relation to FIG. 1.

FIG. 6A is a block diagram of a single bead geometry. In single bead deposition, a single bead 600 of material is deposited onto a flat plate 602. In general, the plate 602 is large enough in the x and y directions that the melt pool geometry in the middle of the plate 602 (and other characteristics of the near-melt-pool thermal field) are not affected by the free edges of the plate 602. The plate thickness (in the z direction) may be large enough that the bottom surface does not affect the near-melt-pool thermal field. Alternatively, the plate thickness may be a thickness selected by a user and held constant across all tests.

FIG. 6B is a block diagram of a sequential bead geometry. This geometry may be used to fill an internal area. For this geometry, many beads 606 are assumed to exist to the left of a bead 604 being deposited.

In other examples, an external radius geometry can be mapped. For this geometry, there may be various radii, e.g., external radius 630, to be mapped. In addition, various turn angles can be mapped; a 90° turn is a common example of a turn angle.

One or more steady-state geometries, transient geometries, or both may be combined to result in the deposition of a single layer of an arbitrary planar shape. Building of successive layers allows the building of arbitrarily complex 3-D shapes.

In steady-state geometries (e.g., the geometries shown in FIGS. 6A and 6B), if process variables are held constant during deposition, then the near-melt-pool thermal field does not change because the geometry of the feature does not change in the deposition direction. In transient geometries, as deposition progresses under constant P, V, $\gamma$, and $T_0$ conditions, the near-melt-pool thermal field is generally changed via its interaction with the radius. The techniques described herein for generating process maps can be applied to map steady-state or transient geometries. When mapping transient geometries for each combination of process variables, integrated thermal field characteristics will generally be a function of location of the moving heat source as it travels through the changing geometry (adding another variable to the process map).

Process mapping of steady-state values of a thermal field characteristic in terms of primary process variables P and V, applicable to AM processes, will now be described with reference to FIG. 7. FIG. 7 is a flowchart of an example of a process 700 for generating a power-velocity (P-V) process map for a thermal field characteristic. In this implementation of process mapping, all other primary process variables are assumed to be held constant.

In AM processing, the value of $\gamma$ is typically held constant, so process maps for a single value of $\gamma$ may be most relevant. Thus, details are given for P-V process mapping for a single value of $\gamma$ (or $\phi$) using a small number of initial experiments and/or simulations, the results of which are included as training data 110 for modeling the AM process. Process maps for a fixed value of MFR, $\phi$, or another parameter related to MFR may also be developed using similar procedures. Thermal field characteristics can also be mapped for multiple values of $\gamma$ (e.g., for selected values of $\gamma$ and/or for the entire range of $\gamma$) by applying this training data to other values of $\gamma$, which can be combined with non-dimensionalized parameters 106 for the machine learning logic engine 108.

Other process variables (related to part geometry and far-field temperature $T_0$) are also assumed constant unless otherwise stated. Thus, the P-V process map will be developed for a single commonly fabricated geometry, or, if the commonly fabricated geometry has one or more variables associated with it (such as wall height or distance from a free edge), the P-V process map may be determined for a single value of that variable.

Additional process maps can be developed for variations of the geometry using the non-dimensionalization of the variables as described in relation to FIG. 1, without performing additional experiments or a minimal number of additional experiments. In the implementation described below and illustrated in FIG. 7, the mapping procedure is used to map steady state values of integrated thermal field characteristics. With modification, the mapping process 700 may be used to map transient responses of integrated thermal field characteristics (e.g., how the evaporation rate changes as deposition is initiated near a plate edge and progresses toward the plate center) but in this case the location of the melt pool would become another process variable.

To generate a P-V process map for a particular integrated thermal field characteristic, for a single value of $\gamma$, geometric variable, and $T_0$, minimum and maximum P and V values of interest (e.g., a range of P and V relevant to a particular type or types of AM process) are identified to define the P and V operating ranges for the process map.

A series of tests (experiments or simulations) within these P and V ranges (for instance, testing a rectangular grid of P, V combinations), can be used to approximately determine curves of constant integrated thermal field characteristic, and these can be refined using the non-dimensionalization of the process variables as inputs for the machine learning logic engine 108. It is typical that a somewhat smaller range of P, V combinations may be adequate for this task.

For these initial tests, $\gamma$ can be any single value between 0 (no added material) and infinity (no re-melted material) and the resulting process map will be for that value of $\gamma$. However, because the melt pool areas, A, may not be known for each case (assuming no prior experiments have occurred), a nonzero value of $\gamma$ may not be able to be accurately specified before each test is performed. To address this issue, initial tests may be performed with $\gamma=0$ (no added material). Subsequent tests can be performed with $\gamma=0$ to create an increasingly accurate P-V process map for $\gamma=0$. Alternatively, values of A extracted from the initial tests with $\gamma=0$ can be used to approximate MFR values associated with a desired, nonzero value of $\gamma$ in subsequent tests (ultimately creating an accurate P-V process map for a single nonzero value of $\gamma$). This issue can also be avoided by creating a process map for a constant value of a quantity related to MFR other than $\gamma$ or $\phi$ such as a map for a constant value of MFR or, for powder bed processes, a constant value of powder layer thickness.

For each test, the integrated thermal field characteristic is measured or assessed, along with A and $A_{deposited}$ (or $A_{remelted}$) to confirm the value of $\gamma$. These quantities are readily evaluated in thermal simulations. In experiments, integrated thermal field characteristics on the surface can be determined by thermal imaging and post processing methods. A can be determined from post process sectioning normal to the direction of beam travel, $A_{deposited}$ can be determined by dividing the MFR by V. Interpolations are then made between experimental data points with predictions data 112, allowing for the drawing of curves of constant integrated thermal characteristic, as described in relation to FIG. 1.

The accuracy of the process map can be increased by performing additional experiments and/or simulations by the machine learning logic engine 108. If desired, additional process maps may also be generated at different $\gamma$ values, for different geometries or values of the geometric variable for one geometry, and for different values of $T_0$. Over time, data can be added to a process map such that the process map more accurately characterizes a particular piece of equipment. In some embodiments, the additional experiments and/or simulations may involve changing secondary process variables to quantify their role in changing the integrated thermal field characteristic across the range of primary process variables.

Similar mapping techniques can also be applied to a generalized thermal field, such as a region of a surface (or subsurface) that is heated (that does not have to have a maximum temperature greater than or equal to the melting temperature). Even in the case of the existence of a melt pool, it may be important to quantify integrated thermal field characteristics of regions at temperatures above or below the melting temperature (within or outside of the melt pool boundary, respectively).

Once a P-V process map for an integrated thermal field characteristic is developed it can be used to determine P and V values yielding a desired integrated thermal field characteristic value. It can also be used as a guide to maintaining the integrated thermal field characteristic as P, V, and MFR are changed. When changing V on a constant $\gamma$ or $\phi$ process map, MFR is increased or decreased proportionally with V to maintain the $\gamma$ or $\phi$ value of the map.

Construction of P-V process maps for commonly fabricated geometries allows the integrated thermal field characteristic to be maintained across all geometries. Once P-V maps are developed for commonly fabricated geometries, general, complex 3-D part geometries can be fabricated by decomposing the complex geometries into combinations of common, mapped features.

In practice, process mapping may be simplified. For instance, the effect of $T_0$ may only be a concern in certain cases, such as continuous deposition (i.e., no pausing between bead deposition) resulting in heat build-up, or deposition of one bead at a time followed by a pause to allow the part to cool to ambient temperature. If the effect of $T_0$ is only of concern in these cases, then process maps can be generated experimentally only for these cases, and additional maps can be based on the training data 110 generated for those process maps. As another example, when a part is actively preheated to a particular $T_0$ value prior to deposition, only a few values of $T_0$ may be of interest. Process mapping for multiple values of $\gamma$ can be similarly simplified by first constructing maps for the extreme values of $\gamma=0$ (no added material) and $\gamma$ approaching infinity (no re-melted material) to determine the importance of $\gamma$.

An important concern in AM and related thermal processes is the sensitivity of the process to changes or fluctuations in one or more process variables. In particular, the sensitivity of some thermal process characteristic (such as melt pool geometry, temperature derivatives such as cooling rates or thermal gradients, or integrated thermal field characteristics) to changes in process variables may be of concern. In some cases, sensitivity to process variable changes is good, such as when a rapid change in a thermal process characteristic is desired in a process control system. In other cases, sensitivity to process variable changes is bad, such as when minor fluctuations in process variables yield undesired physically significant fluctuations in a thermal process characteristic.

The sensitivity of process thermal characteristics to changes in process variables may be dependent on the location within process variable space where the change occurs (i.e., the values of primary process variables P, V, $\gamma$, deposition geometry, and $T_0$) and the specific process thermal characteristic being considered. This sensitivity can be characterized by process maps. The thermal characteristics that can be mapped can be any quantity related to the thermal field, including thermal field dimensions, temperature derivatives (in time or space), temperature integrals (in time or space), or combinations of these. As with other process mapping techniques, the thermal process that is mapped is also general and not limited to additive manufacturing processes.

Overall, representation of process characteristic dependence in the form of process maps allows the concepts of the broad field of differential geometry to be applied to the analysis of AM and related thermal processes. For instance, if a thermal process characteristic expressed as a function of P and V forms a developable surface, then one of its principal curvatures will equal zero. In such a case, the direction of zero curvature will be the direction of constant process characteristic (e.g., a curve of constant A). Because the directions of principal curvatures are orthogonal (normal to one another), the direction of maximum magnitude curvature will be normal to the direction of the curve of a constant process characteristic. In such cases, not only is the direction of maximum change of process characteristic (the gradient) normal to the curve of constant process characteristic, but the direction of maximum change in gradient (curvature) is also normal to the curve of constant process characteristic.

Process maps generated according to the techniques described above can be used to identify which process variables a certain process characteristic is most sensitive to, based on the direction of maximum change in that process characteristic. For example, if the direction of maximum change in process characteristic is primarily in the direction of the beam power axis, then that process characteristic will be sensitive to minor fluctuations in beam power (more than minor fluctuations in beam velocity). The process maps may also provide insight into why some AM processes may be more sensitive to some process variable fluctuations than others, and why different process characteristics show different sensitivities within a single process. In some cases, such as applications of feedback control systems, large, rapid changes in process characteristics are desired. In such cases, the process maps can be used to identify combinations of process variables that can be changed that are most effective at achieving rapid process characteristic changes.

Figure 7A:
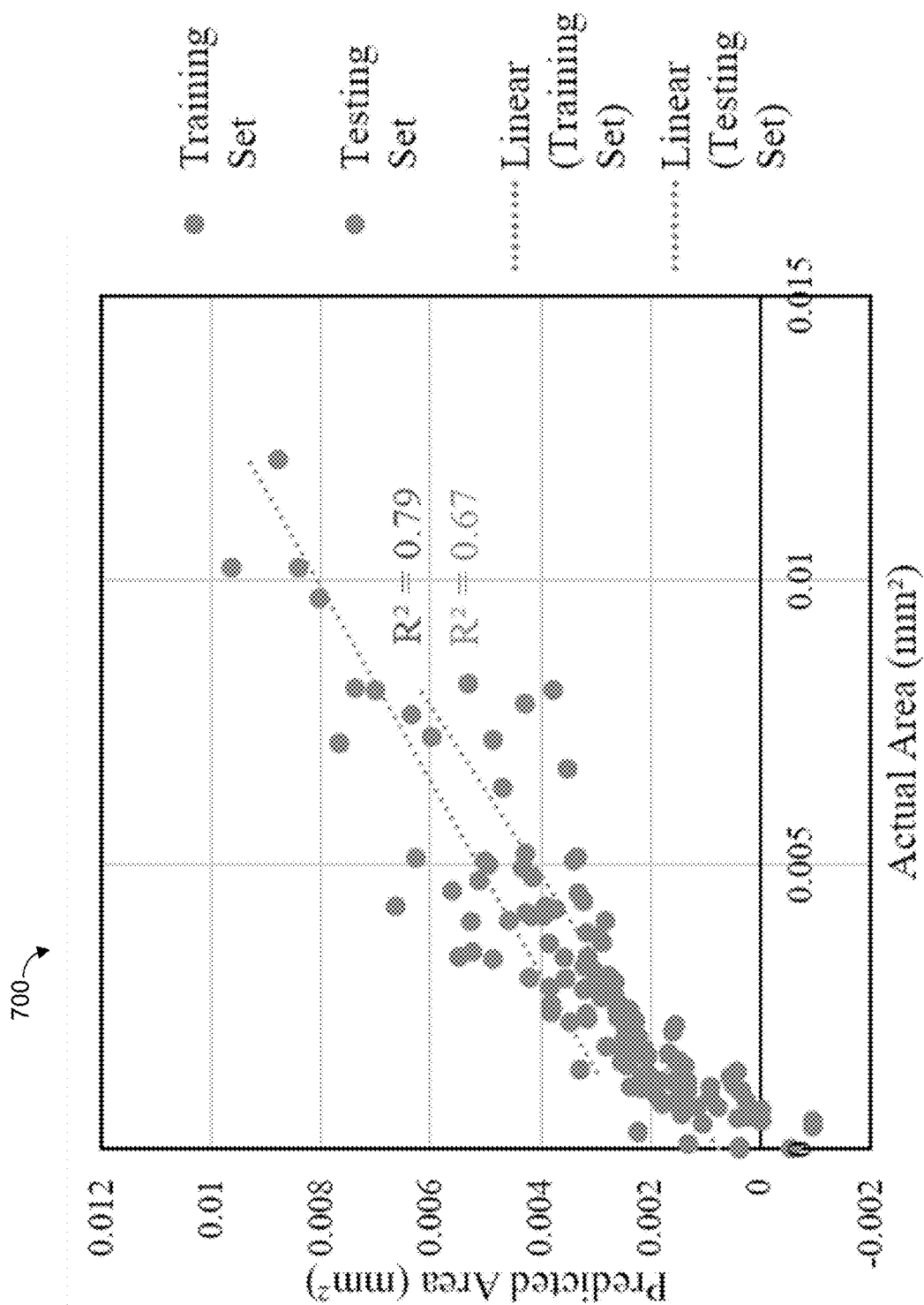
FIGS. 7A, 7B, and 7C each include a graph showing a comparison between predicted melt pool dimensions and actual melt pool dimensions using a linear regression analysis.
Figure 7B:
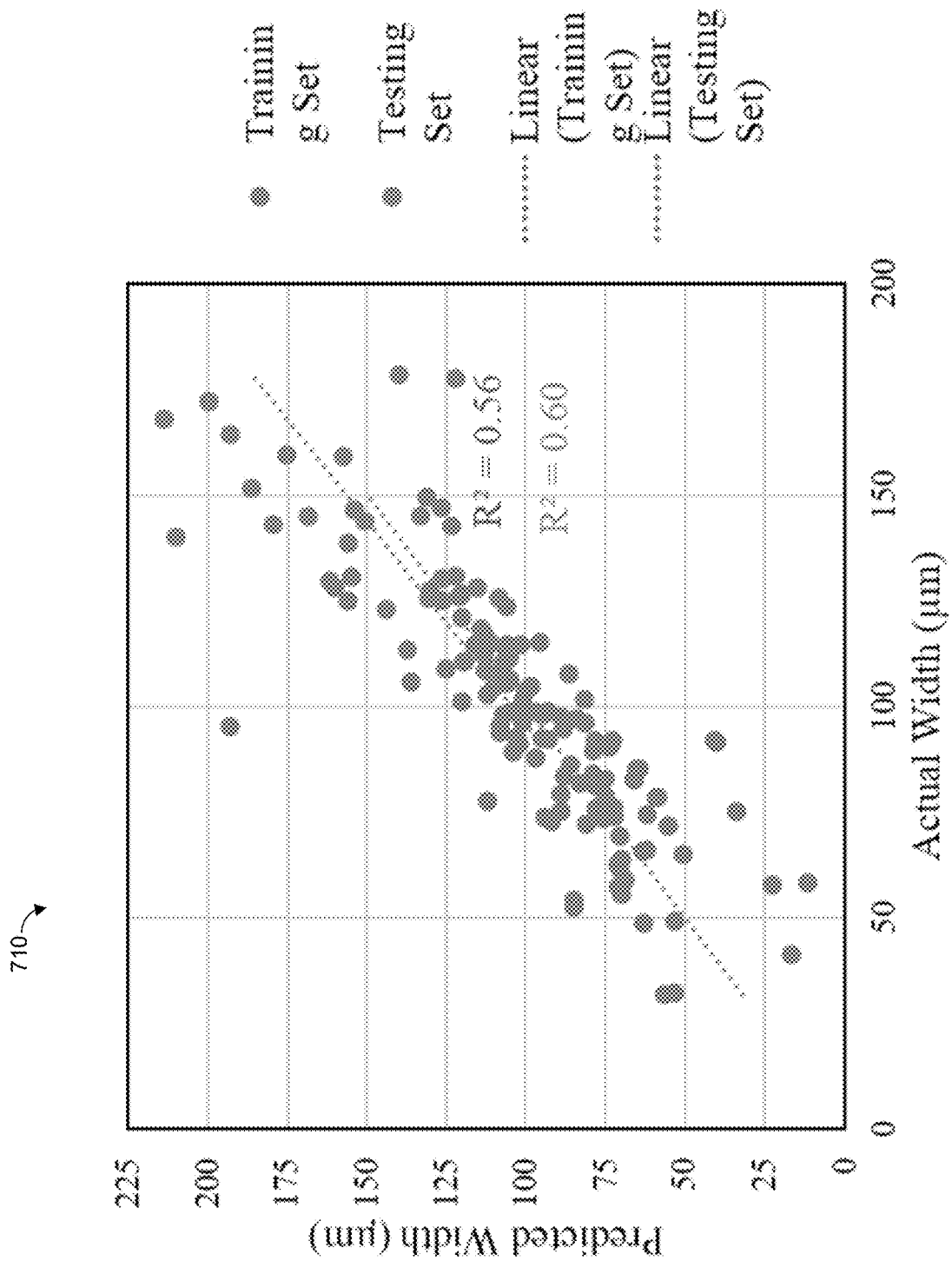
Figure 7C:
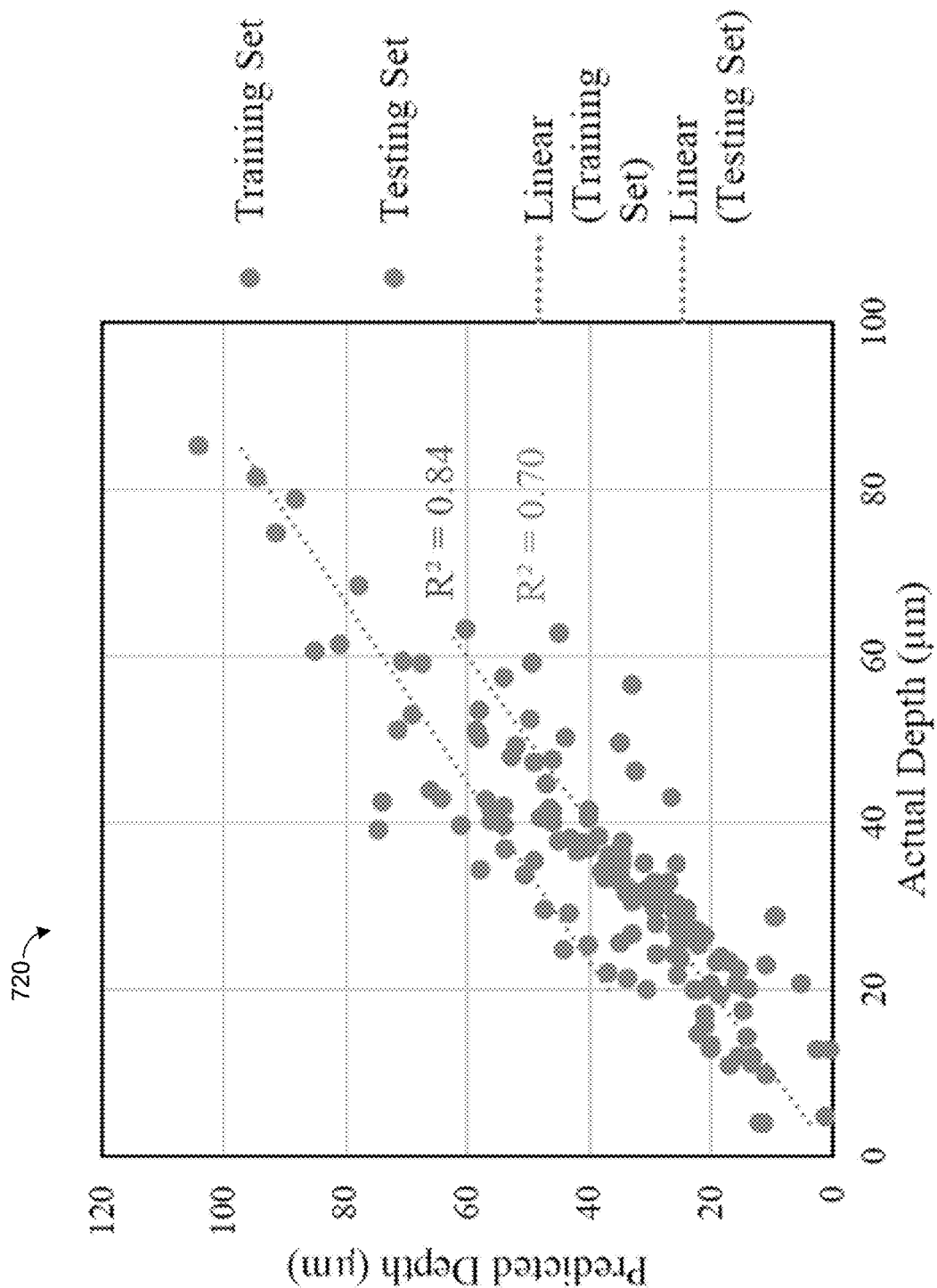

FIGS. 7A-7C each include a graph showing a comparison between predicted melt pool dimensions and actual melt pool dimensions using a linear regression analysis. Data from experiments for different sets of materials and processing conditions is used to develop the framework. These are referred to as the set of training data 110. After that, melt pool geometry data on IN718 can be used to test the prediction capability of the framework. These are referred to as a testing set. These details are provided in Table 2.

TABLE 2

Details of the data used for training and testing

| | Samples from material | Sample size |
|---|---|---|
| Training Set | IN625, Ti64, SS 316, SS 17-4, and AlSi10Mg | 111 |
| Testing Set | IN718 | 27 |

Regression is a commonly used supervised learning technique for predicting continuous output values for a given set of inputs. This is done by training the algorithm over available instances of input features and testing it on unseen instances. When linear regression is applied on the training data 110 with four input parameters: Power (P), Velocity (V), k/ρc, $T_m-T_0$, it yielded low $R^2$ values as shown in FIGS. 7A-7C for melt pool area (graph 700 of FIG. 7A), melt pool width (graph 710 of FIG. 7B), and melt pool depth (graph 720 of FIG. 7C). This is possible because linear regression did not adequately capture the underlying non-linear structure in the data. Thereafter, regression using neural networks was applied.

Figure 8A:
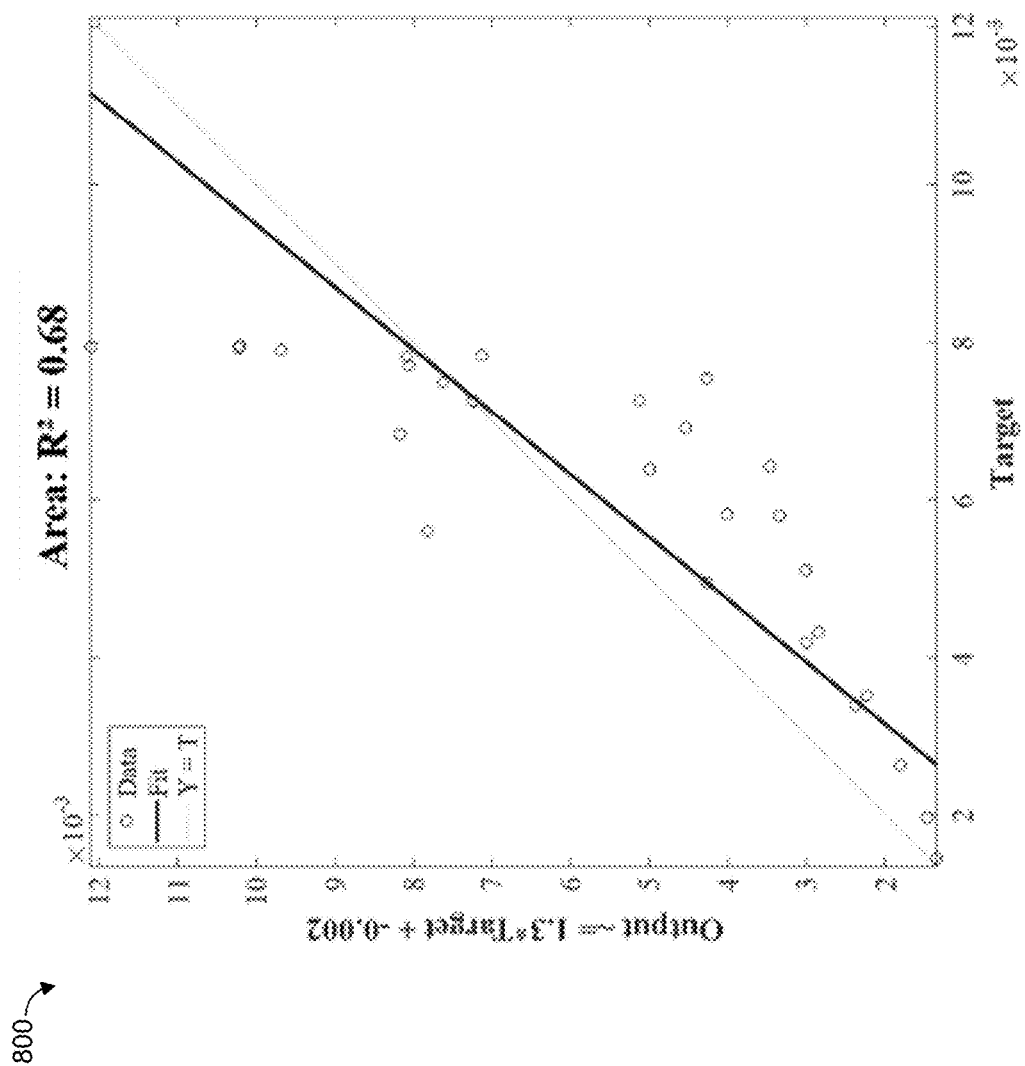
FIGS. 8A, 8B, and 8C each include a graph showing a comparison between predicted melt pool dimensions and actual melt pool dimensions using a neural network regression analysis without using non-dimensionalized variables.
Figure 8B:
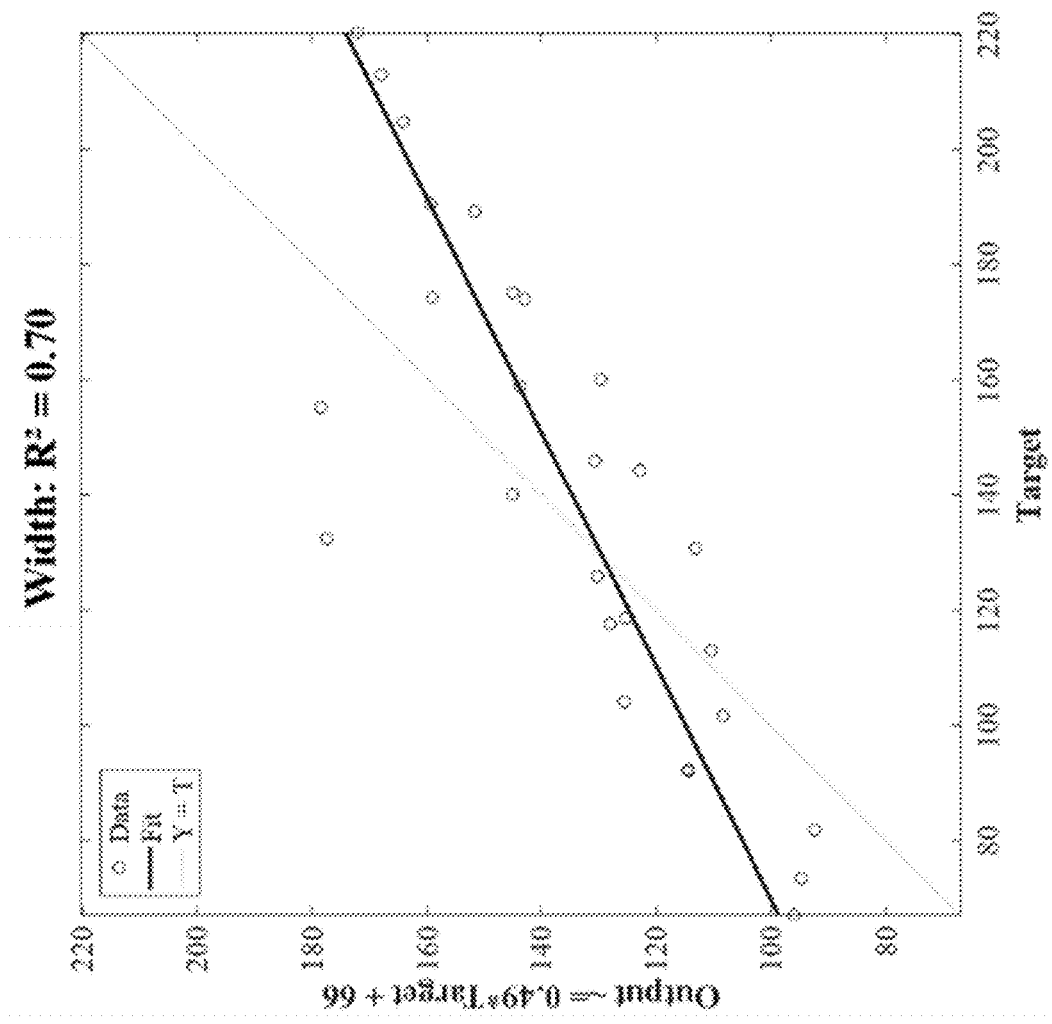
Figure 8C:
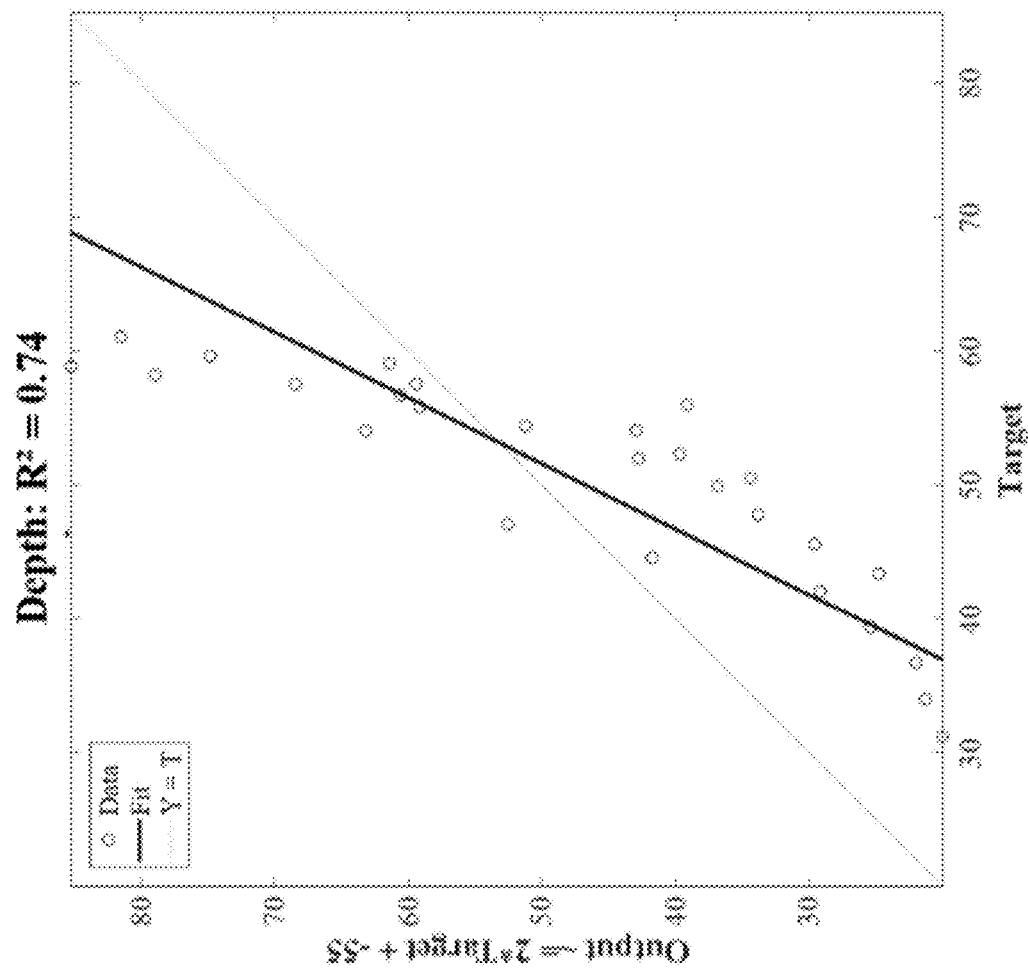

FIGS. 8A-8C each include a graph showing a comparison between predicted melt pool dimensions and actual melt pool dimensions using a neural network regression analysis without using non-dimensionalized variables. Graph 800 of FIG. 8A, graph 810 of FIG. 8B, and graph 820 of FIG. 8C show that the prediction performance improved when compared to simple linear regression approach for melt pool width. In case of melt pool area and melt pool depth, linear regression performed well when compared to neural network regression, because the linear regression approach is less sensitive to noise (e.g., variability caused by border line keyholing cases) as compared to neural network approach. Generally, the keyholing effect is more significant on melt pool depth and area when compared with melt pool width. Further improvement is subsequently shown for non-dimensionalized input features. The feature set is decomposed from four variables to a single variable using non-dimensionalization, and output values are mapped to the transformed input feature.

Dimensionless graphs are based on Equation 1 for predicting melt pool characteristics over a range of welding conditions and material properties. Non-dimensionalized variables developed are given by Equations 2-5 (reproduced from the examples previously discussed in relation to FIG. 1).

$$\eta = \frac{qv}{4\pi\alpha k(T_m - T_0)} \quad (2)$$

$$a = \frac{Av^2}{4\alpha^2} \quad (3)$$

$$w = \frac{Wv}{2\alpha} \quad (4)$$

$$\eta = \frac{qv}{4\pi\alpha k(T_m - T_0)} \quad (5)$$

In these equations, an average of the values between initial part temperature and melting temperature are used for thermo-physical properties. The non-dimensional framework developed for welding processes is applied to laser powder bed processes to predict melt pool geometry for a wide range of materials and process conditions.

Figure 9A:
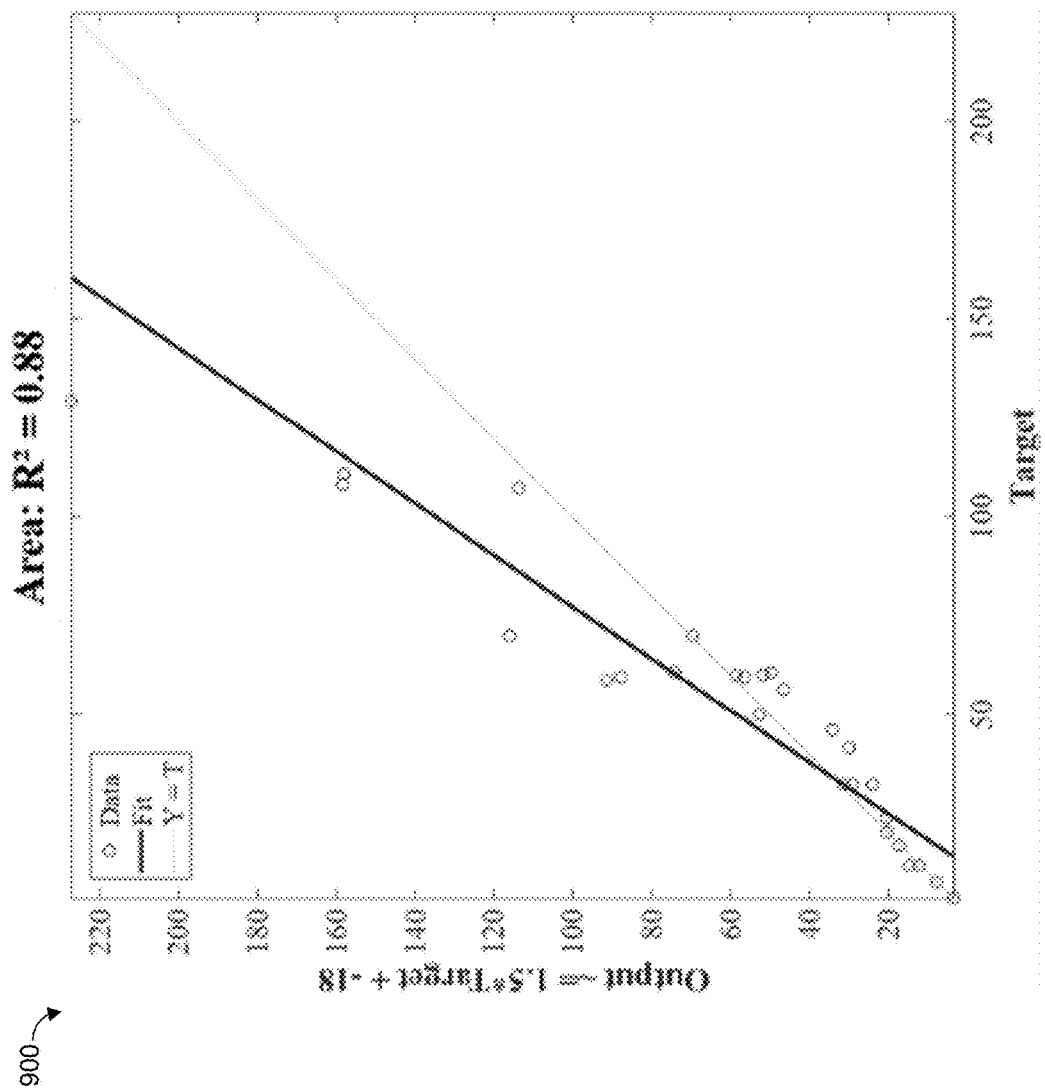
FIGS. 9A, 9B, and 9C each include a graph showing a comparison between predicted melt pool dimensions and actual melt pool dimensions using a neural network regression analysis using non-dimensionalized variables.
Figure 9B:
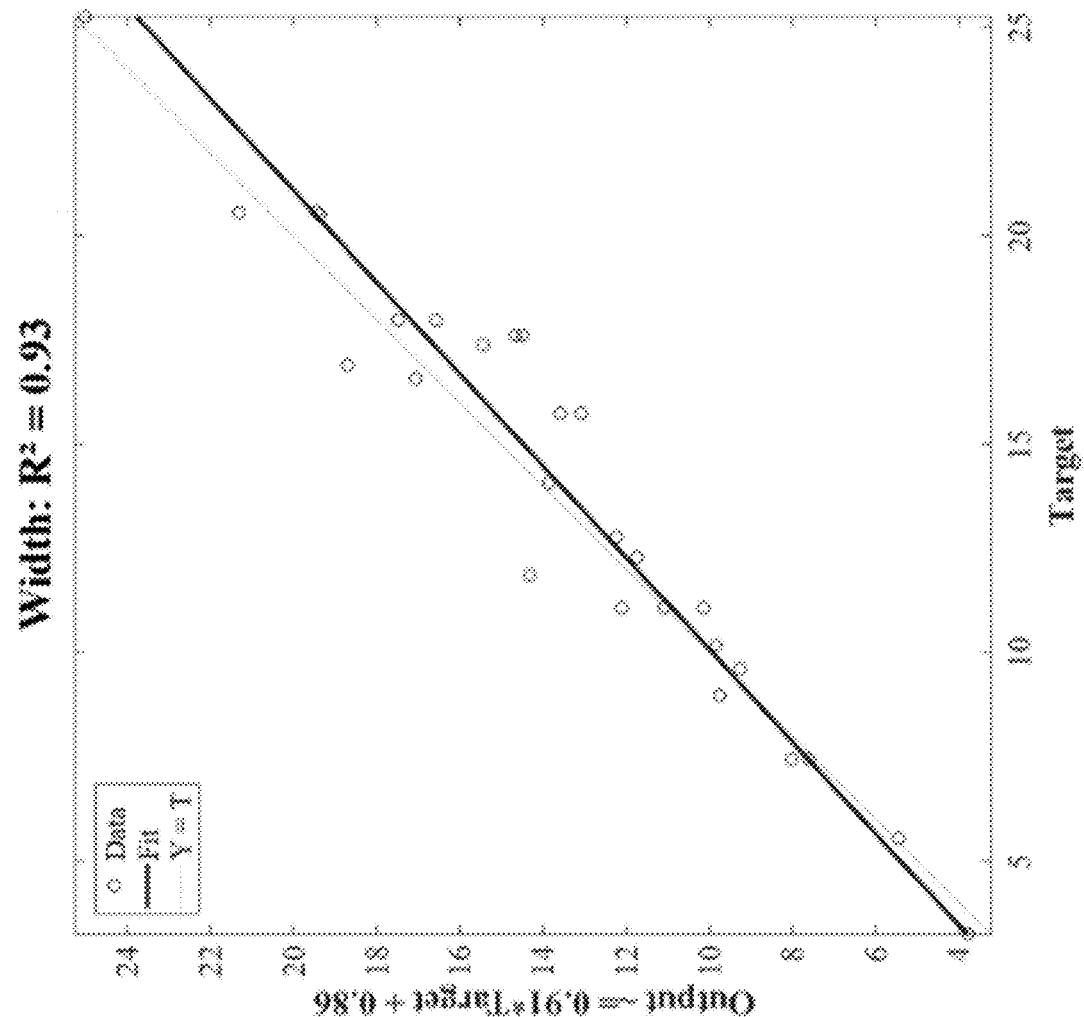
Figure 9C:
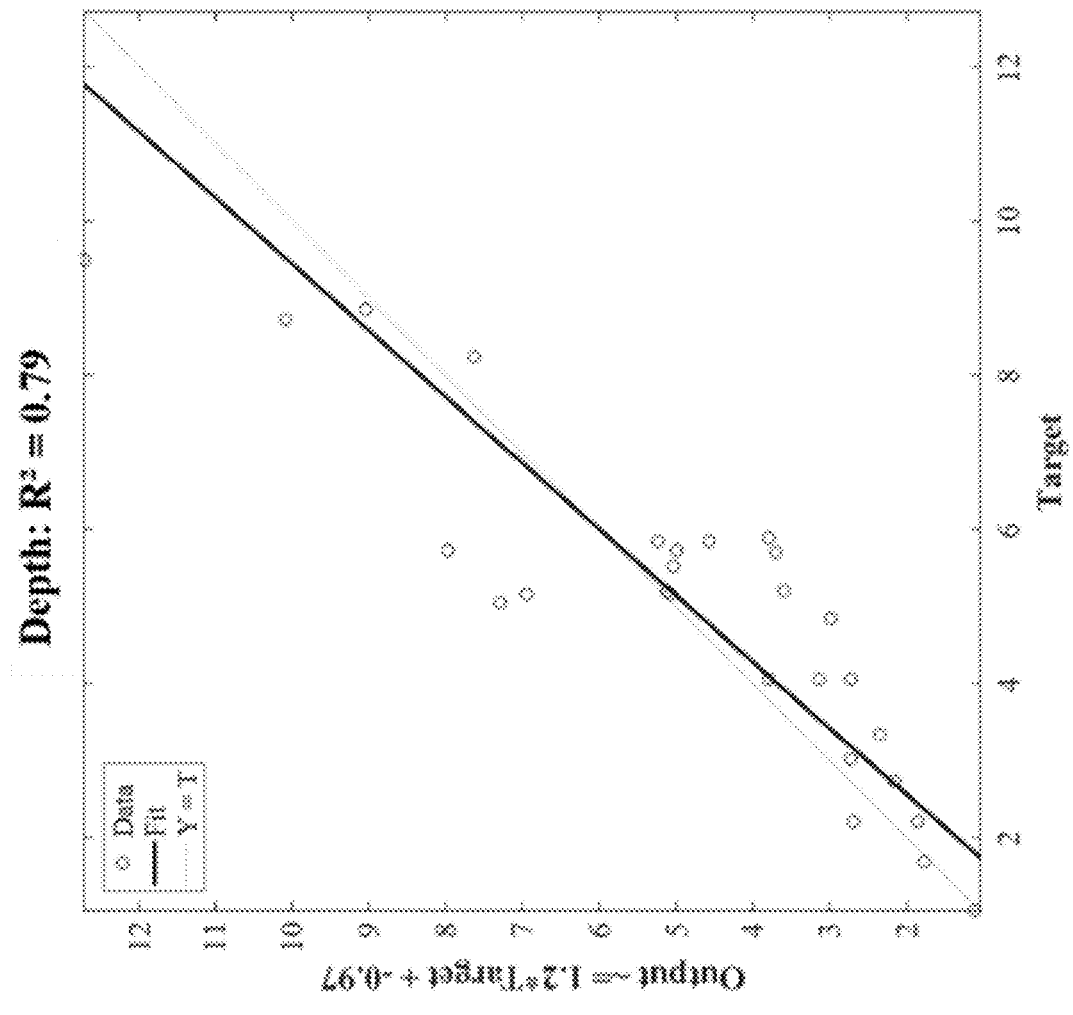

FIGS. 9A-9C each include a graph showing a comparison between predicted melt pool dimensions and actual melt pool dimensions using a neural network regression analysis using non-dimensionalized variables. Similarly to graphs 800, 810, and 820, respectively, graph 900 of FIG. 9A shows predictions for melt pool area, graph 910 shows predictions for melt pool width, and graph 920 shows predictions for melt pool depth, each being compared to experimental data. When using input features generated by non-dimensionalization, overall prediction performance using neural networks improved when comparing graphs 900, 910, and 920 to their counterparts 800, 810, and 820. Multivariate linear regression still performed better in the case of depth owing to the variability caused by borderline keyholing cases. This can be explained based on the result that keyholing affect is more significant on melt pool depth and area compared with melt pool width. Nevertheless, this example illustrates the significance of using non-dimensionalization to improve the performance of data-driven prediction framework.

Figure 10:
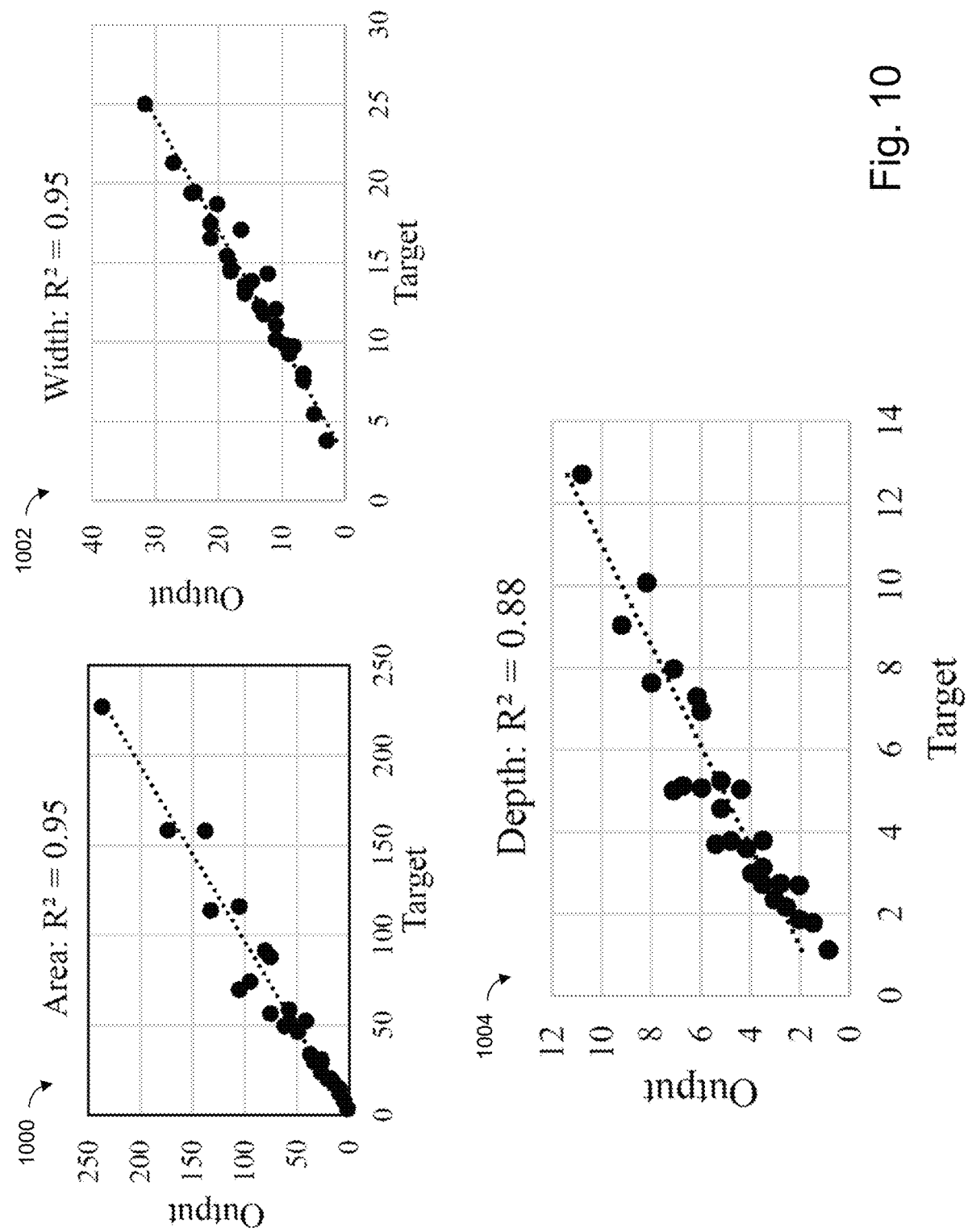
FIG. 10 includes graphs each showing a comparison between predicted melt pool dimensions and actual melt pool dimensions using power regression using non-dimensionalized variables.

FIG. 10 includes graphs each showing a comparison between predicted melt pool dimensions and actual melt pool dimensions using power regression using non-dimensionalized variables. Plots 1000, 1010, and 1020 of FIG. 10 indicate that the performance of power regression for non-dimensionalized input data appears to be better than the neural network regression for the prediction of melt pool geometry for testing set. The process parameter range in the current testing data for IN718 has a narrow band (e.g., beam power: 100 to 370 W and beam travel velocity: 200 mm/s to 1400 mm/s).

Figure 11:
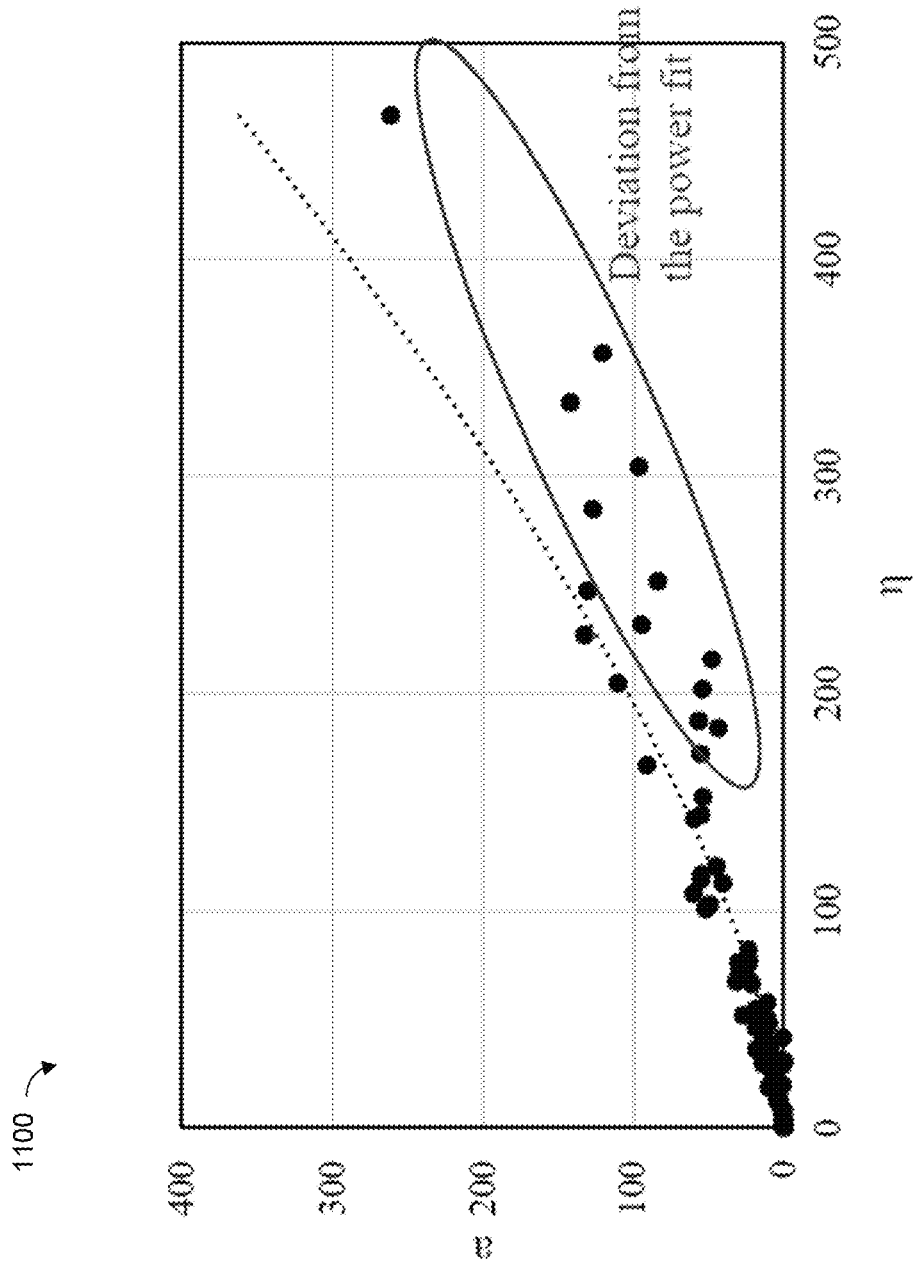
FIG. 11 is a graph showing deviation of measured melt pool dimensions from a power regression universal fit.

However, for wider parameter range, especially at high velocities, deviation can be observed from the normalization curve. FIG. 11 is a graph 1100 showing deviation of measured melt pool dimensions from a power regression universal fit. In such situations, neural network regression or piece wise power regression can potentially capture better the underlying structure of the data, in comparison to a simple universal power fit.

Figure 12:
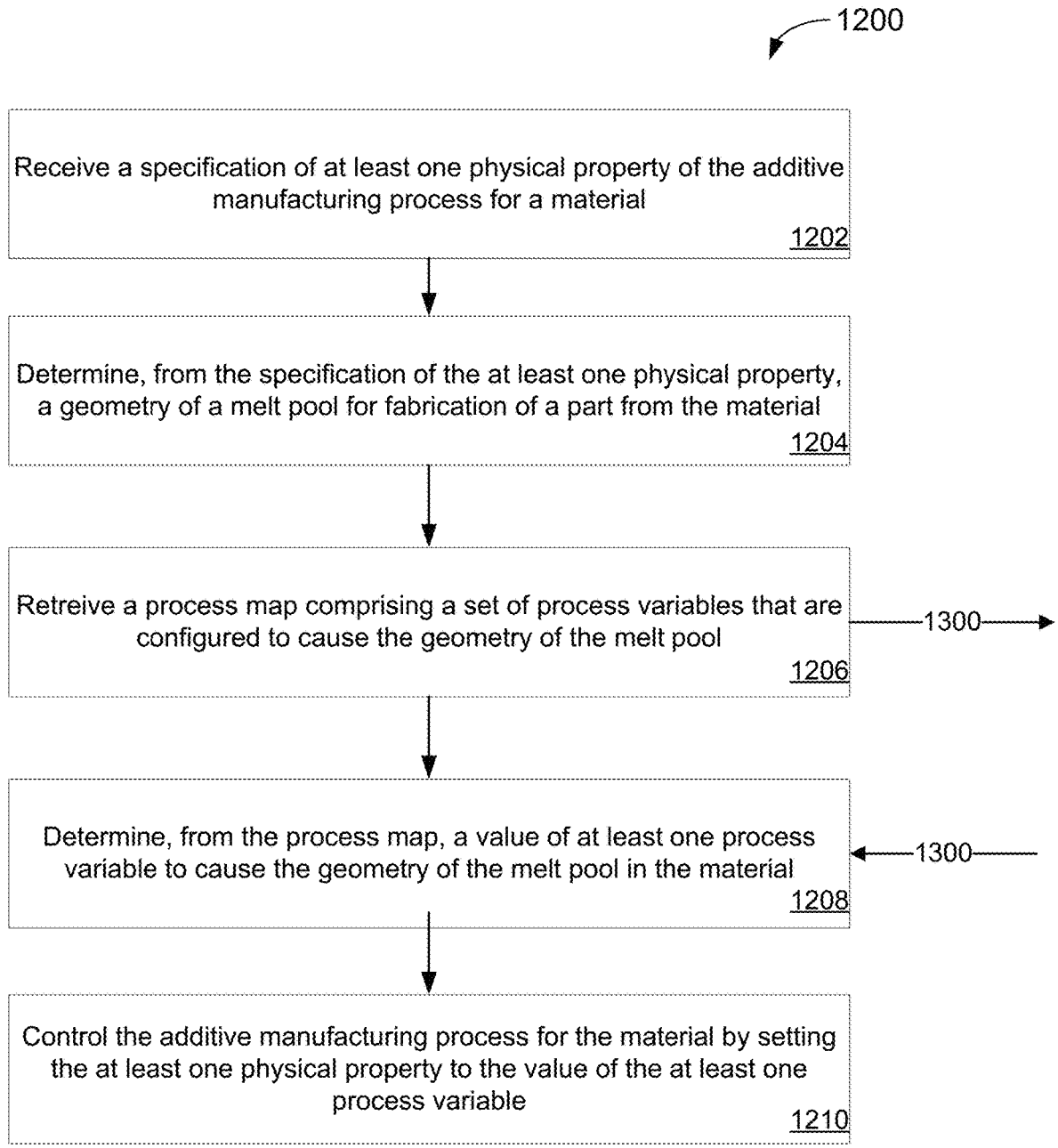
FIGS. 12-13 are flow diagrams of processes for performing non-dimensionalization of variables to enhance machine learning.
Figure 13:
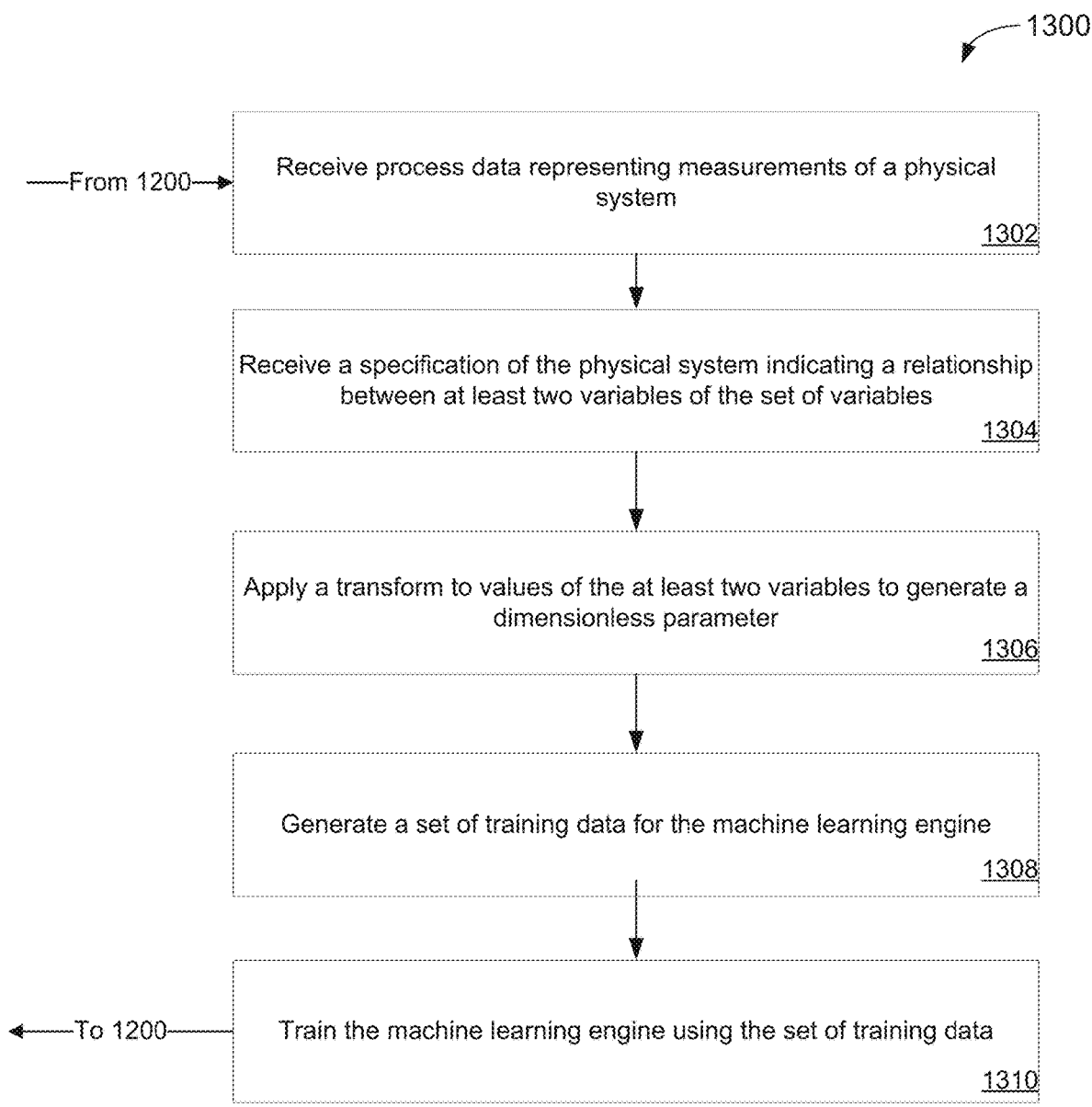

FIGS. 12-13 are flow diagrams of processes for performing non-dimensionalization of variables to enhance machine learning. Turning to FIG. 12, a process 1200 for controlling an additive manufacturing is shown. In some implementations, the process 1200 can be performed or controlled by a computing system, such as system 100 of FIG. 1 and/or system 1412 of FIG. 14. The system 100 is configured to receive (1202) a specification of at least one physical property of the additive manufacturing process for a material. The specification can include specification data 120. The specification can describe the physical system of the AM process and include any relationships that exist between variables of the variables data 102.

1. The process 1200 includes determining (1204), from the specification of the at least one physical property, a process outcome for fabrication of a part from the material. The process outcome can include the desired shape of a part to be manufactured from the material and can be based on one or more of a melt pool geometry, a temperature gradient in the material, a temperature integral in the material. The process outcome can include one of a dimension of the part or a surface roughness of the part. In some implementations, the material can include any material used in AM processes. In the examples described herein, the material is generally a metal.

The process 1200 includes retrieving (1206) a process map comprising a set of process variables that are configured to cause the geometry of the melt pool. The process map can be generated by receiving a set of training data comprising a dimensionless parameter, the dimensionless parameter being a combination of at least two variables each representing a physical property of the additive manufacturing process and applying the set of training data to machine learning logic to generate predictions of the geometry for different values of the dimensionless parameter, the predictions of the geometry from the process map. This is described further in relation to FIG. 13. The process map includes the values of inputs to the AM process for generating the desired part shape from the material. Generally, the process map can be generated in advance of forming the part from the material in the AM process, and the process map is used as a reference during the fabrication of the part.

The process 1200 includes determining (1208), from the process map, a value of at least one process variable for the additive manufacturing process to cause the geometry of the melt pool in the material. This value is generally an input to the AM process, such as beam speed, beam power, etc. To fabricate the part from the material, the process 1200 includes controlling (1210) the additive manufacturing process for the material by setting the at least one physical property to the value of the at least one process variable during fabrication of the part. For example, controlling the AM process can include determining, based on the process map, a particular value for the at least one process variable for causing the melt pool to cool at a specific rate and adjusting heat in a region of the part based on the particular value, thereby causing the melt pool in the part to cool at the specific rate. This can change the microstructure in the resulting part.

The process map can be updated with experimentation, simulations, or both experimental and simulated data. In some implementations, the process 1200 includes receiving values of measurements of an additive manufacturing process, each measurement corresponding to a variable for the additive manufacturing process. The process 1200 can include receiving data indicating a relationship between at least two of the variables. The process can include applying a transform to the values of the measurements of the at least two variables to generate additional values of the dimensionless parameter. The process 1200 can include updating the set of training data for the machine learning logic based on the additional values of the dimensionless parameter. To update the model, the process 1200 includes training the machine learning logic using the updated set of training data. The non-dimensional (e.g., dimensionless) parameter of the process 1220 can be generated by selecting, based on the specification, at least two process variables of the additive manufacturing process that are physically related, and combining the at least two process variables into the dimensionless parameter. In some implementations, the dimensionless parameter is generated by selecting, based on the specification, at least one process variable of the additive manufacturing process and at least one material variable of the additive manufacturing process, the at least one process variable and the at least one material variable being physically related, and combining the at least one process variable and the at least one material variable into the dimensionless parameter.

FIG. 13 is a flow diagram showing an example process 1300 for training a machine learning engine for modeling of a physical system, such as the example AM process 1200 described in relation to FIG. 12. In some implementations, the process can be performed by the system 100 described in relation to FIG. 1 and/or by the computing system 1412 described in relation to FIG. 14. Process 1300 includes receiving (1302) process data representing measurements of a physical system, the process data comprising a set of variables, each variable having a value corresponding to each measurement of the physical system for that variable. The process 1300 includes receiving (1304) a specification of the physical system indicating a relationship between at least two variables of the set of variables. The process 1300 includes applying (1306) a transform to values of the at least two variables to generate a dimensionless parameter having a parameter value corresponding to each measurement of the physical system for the at least two variables. The process 1300 includes generating (1308) a set of training data for the machine learning engine, the set of training data comprising the dimensionless parameter. The process 1300 includes training (1310) the machine learning engine using the set of training data, the machine learning engine configured to output a prediction of a value of a physical effect of the physical system for values of the variables that are not included in the original process data (e.g., the training data).

In some implementations, the process 1300 includes applying logic of the machine learning engine to a set of unmeasured values of the set of variables by applying one of neural network regression or piecewise power regression. In some implementations, the process 1300 includes generating, in response to the applying, a set of prediction values for the physical effect, the prediction values corresponding to the unmeasured values of the set of variables.

In some implementations, the prediction of the physical effect has an accuracy within a given threshold, and a first size of the set of training data comprising the dimensionless parameter is smaller than a second size another set of training data that does not include the dimensionless parameter and that trains the machine learning engine to generate the prediction having the accuracy within the given threshold. As described in relation to FIG. 1, the non-dimensionalization of the variables data 102 enables the machine learning logic engine 108 to generate predictions data 112 with comparable accuracy using less data to predictions by the machine learning logic engine 108 using the variables data 102. In some implementations, training the machine learning engine using the set of training data that includes the dimensionless parameter requires less processing time than training the machine learning engine using the other set of training data that does not include the dimensionless parameter.

Figure 14:
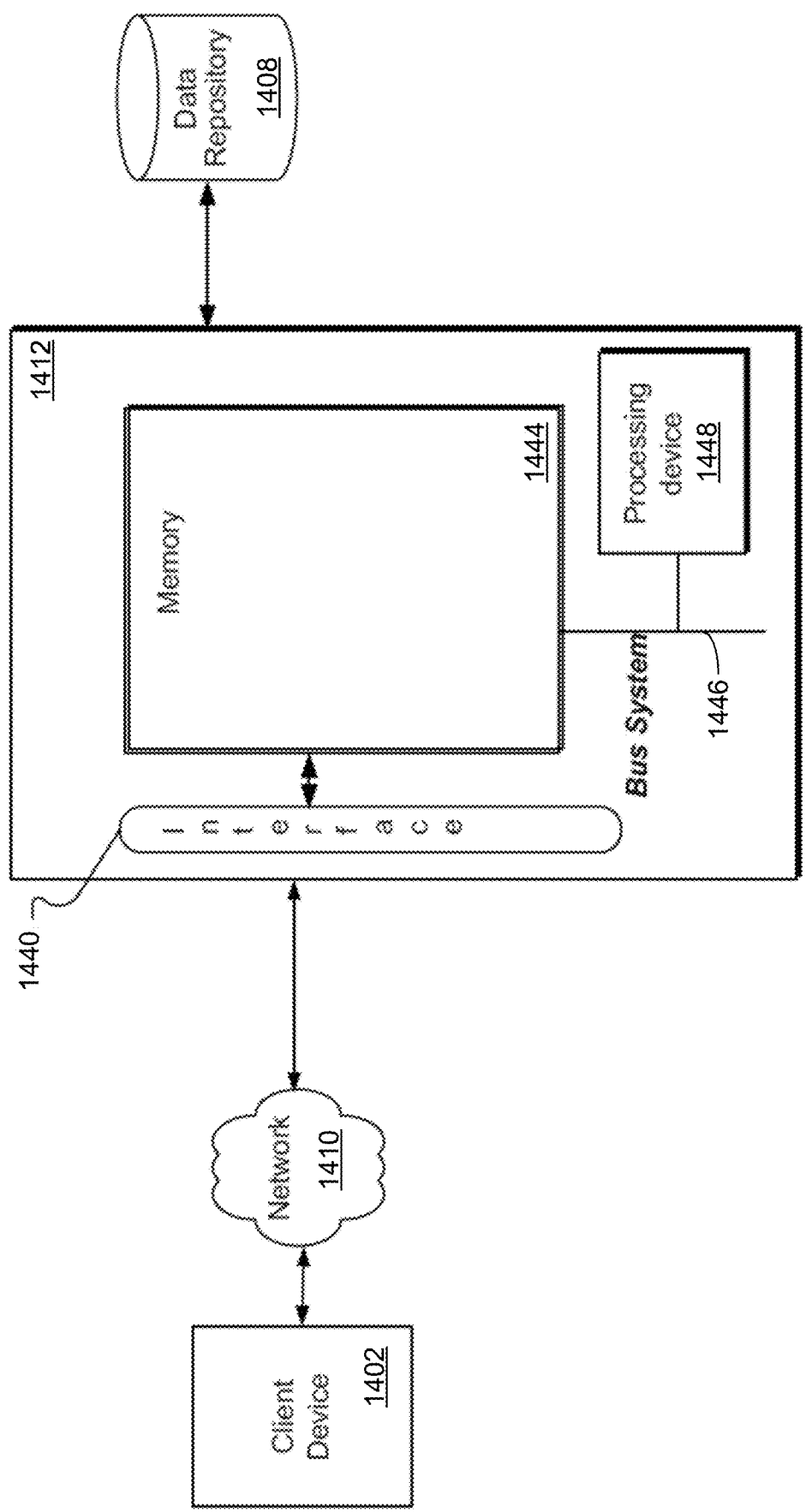
FIG. 14 is a block diagram of an example of a processing system environment for generating a process map.

FIG. 14 is a block diagram of an example of a processing system environment 1400 for generating a process map. In FIG. 14, a client device 1402 can be any sort of computing device capable of taking input from a user and communicating over network 1410 with a computing system 1412 and/or with other client devices. For example, the client device 1402 can be mobile devices, desktop computers, laptops, cell phones, personal digital assistants ("PDAs"), servers, embedded computing systems, and so forth.

To provide for interaction with a user, the client device 1402 may include a display device (e.g., a CRT (cathode ray tube), LCD (liquid crystal display), touch screen display, or other monitor) for displaying information to the user, and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

Computing system 1412 can be any of a variety of computing devices capable of receiving data, such as a server, a distributed computing system, a desktop computer, a laptop, a cell phone, a rack-mounted server, and so forth. Computing system 1412 may be a single computing device or a group of devices that are at a same location or at different locations. Computing system 1412 can be configured to execute the techniques and operations described herein to generate a process map. In an example, computing system 1412 is configured to transmit, over network 1410, information indicative of the generated process map to the client device 1402. In some implementations, computing system 1412 includes system 100 described in relation to FIG. 1.

The illustrated computing system 1412 can receive data from the client device 1402 via input/output ("I/O") interface 1440. I/O interface 1440 can be any type of interface capable of receiving data over a network, such as an Ethernet interface, a wireless networking interface, a fiber-optic networking interface, a modem, and so forth. Computing system 1412 also includes a processing device 1448 and memory 1444. A bus system 1446, including, for example, a data bus and a motherboard, can be used to establish and to control data communication between the components of computing system 1412.

The illustrated processing device 1448 may include one or more microprocessors. Generally, processing device 1448 may include any appropriate processor and/or logic device that is capable of receiving and storing data, and of communicating over a network (not shown). Memory 1444 can include a hard drive and a random access memory storage device, such as a dynamic random access memory, or other types of non-transitory machine-readable storage devices. Memory 1444 stores computer programs (not shown) that are executable by processing device 1448 to perform the techniques described herein. The programs can be stored in a data repository 1408.

The techniques described herein can be implemented via computational platforms. Various implementations of the techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

Embodiments can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary implementations of the invention have been described. Nevertheless, it will be understood by one of ordinary skill in the art that various modifications may be made without departing from the spirit and scope of the invention.

What is claimed is:

1. A method for controlling an additive manufacturing process, the method comprising:
receiving a specification of at least one physical property of the additive manufacturing process for a material;
determining, from the specification of the at least one physical property, a process outcome for fabrication of a part from the material;
retrieving a process map comprising a set of process variables that are configured to cause the process outcome, the process map being generated by:
receiving a set of training data comprising a dimensionless parameter, the dimensionless parameter being a combination of at least two variables each representing a physical property of the additive manufacturing process; and
applying the set of training data to machine learning logic to generate predictions of the process outcome for different values of the dimensionless parameter, the predictions of the process outcome from the process map, wherein the machine learning logic comprises neural network regression logic;

determining, from the process map, a value of at least one process variable for the additive manufacturing process to cause the process outcome in the material; and controlling the additive manufacturing process for the material by setting the at least one physical property to the value of the at least one process variable during fabrication of the part, wherein controlling comprises:

determining, based on the process map, a particular value for the at least one process variable for fabricating the part from the material; and causing fabrication of the part form the material based on the particular value for the at least one process variable.

2. The method of claim 1, wherein generating the process outcome is based on one or more of a melt pool geometry, a temperature gradient in the material, a temperature integral in the material.

3. The method of claim 1, wherein the generated process outcome comprises one of a dimension of the part or a surface roughness of the part.

4. The method of claim 1, wherein controlling the additive manufacturing process further comprises:

determining, based on the process map, the particular value for the at least one process variable for causing a melt pool to evaporate at a specific rate;

adjusting heat in a region of the part based on the particular value; and causing the melt pool in the part to evaporate at the specific rate.

5. The method of claim 1, further comprising updating the process map by:

receiving values of measurements of an additive manufacturing process, each measurement corresponding to a variable for the additive manufacturing process;

receiving data indicating a relationship between at least two of the variables;

applying a transform to the values of the measurements of the at least two variables to generate additional values of the dimensionless parameter;

updating the set of training data for the machine learning logic based on the additional values of the dimensionless parameter; and training the machine learning logic using the updated set of training data.

6. The method of claim 1, wherein the dimensionless parameter is generated by:

selecting, based on the specification, at least two process variables of the additive manufacturing process that are physically related; and combining the at least two process variables into the dimensionless parameter.

7. The method of claim 1, wherein the dimensionless parameter is generated by:

selecting, based on the specification, at least one process variable of the additive manufacturing process and at least one material variable of the additive manufacturing process, the at least one process variable and the at least one material variable being physically related; and combining the at least one process variable and the at least one material variable into the dimensionless parameter.

8. The method of claim 1, wherein the dimensionless parameter comprises at least one of:

$$\eta = \frac{qv}{4\pi\alpha k(T_m - T_0)},$$

$$a = \frac{Av^2}{4\alpha^2},$$

$$w = \frac{Wv}{2\alpha}, \text{ and}$$

$$\eta = \frac{qv}{4\pi\alpha k(T_m - T_0)},$$

wherein q is a beam power, v is a beam velocity, $\alpha$ is a thermal diffusivity of the material, k is a thermal conductivity of the material, $T_m$ is a melting temperature of the material, $T_0$ is an initial temperature of the material, A is a melt pool area, a is a dimensionless parameter corresponding to the melt pool area, W is a melt pool width, w is a dimensionless parameter corresponding to the melt pool width, D is a melt pool depth, and d is a dimensionless parameter corresponding to the melt pool depth.

9. The method of claim 1, wherein the set of training data comprises measurements only for materials other than the material of the additive manufacturing process.

10. The method of claim 1, wherein the at least one physical property comprises one of a type of the material, a feed type of the material, and a type of a heat source for heating the material.

11. The method of claim 1, wherein the at least one process variable is selected from a group comprising a power (P) variable associated with a thermal process, a translation speed (V) variable associated with the thermal process, a material feed rate (MFR) variable (or variable related to MFR) used in the thermal process, one or more structure geometry variables, and a structure temperature ($T_0$) variable.

12. The method of claim 1, wherein generating the process map comprises interpolating temperature integrals based on applying the set of training data to the machine learning logic.

13. The method of claim 1, further comprising generating the training data by:

performing a series of tests at different values of the at least one physical property; and measuring a melt pool geometry in the material for each of the different values of the physical property.

14. The method of claim 1, wherein the process map is generated from the set of training data including values for a first alloy, and wherein the process map includes one or more predictions of a melt pool geometry for causing the process outcome in a second alloy that is different from the first alloy.

* * * * *

UNITED STATES PATENT AND TRADEMARK OFFICE
CERTIFICATE OF CORRECTION

| | | |
|---|---|---|
| PATENT NO. | : 11,491,729 B2 | Page 1 of 1 |
| APPLICATION NO. | : 16/402056 | |
| DATED | : November 8, 2022 | |
| INVENTOR(S) | : Sneha Prabha Narra and Jack Lee Beuth, Jr. | |

It is certified that error appears in the above-identified patent and that said Letters Patent is hereby corrected as shown below:

In the Specification

Column 1, Line 16 delete "This invention was made with partial government support under grant National Science Foundation CMMI 1335298. The government has certain rights in the invention" and insert -- This invention was made with United States government support under CMMI1335298 awarded by the National Science Foundation. The U.S. government has certain rights in the invention. --

Signed and Sealed this
Fourteenth Day of January, 2025

Derrick Brent
*Acting Director of the United States Patent and Trademark Office*